(12) United States Patent
Hong et al.

(10) Patent No.: US 11,081,693 B2
(45) Date of Patent: Aug. 3, 2021

(54) COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

(71) Applicants: Samsung Electronics Co., Ltd., Suwon-si (KR); Samsung SDI Co., Ltd., Yongin-si (KR)

(72) Inventors: Sukgi Hong, Seongnam-si (KR); Youhwan Son, Seongnam-si (KR); Byongyong Yu, Yongin-si (KR); Kwangjin Park, Seongnam-si (KR); Junho Park, Seoul (KR); Jinhwan Park, Seoul (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/102,087

(22) Filed: Aug. 13, 2018

(65) Prior Publication Data

US 2019/0067689 A1 Feb. 28, 2019

(30) Foreign Application Priority Data

Aug. 30, 2017 (KR) .......... 10-2017-0110344
Jul. 31, 2018 (KR) .......... 10-2018-0089504

(51) Int. Cl.
*H01M 4/36* (2006.01)
*H01M 4/1391* (2010.01)
(Continued)

(52) U.S. Cl.
CPC ......... *H01M 4/366* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS 6,984,469 B2 1/2006 Kweon et al.
9,391,317 B2 7/2016 Ofer et al.
(Continued)

FOREIGN PATENT DOCUMENTS

EP 3316357 A1 5/2018
JP 1999016566 A 6/1997
(Continued)

OTHER PUBLICATIONS

Maitra et al., "Importance of trivalency and the eg1 configuration in the photocatalytic oxidation of water by Mn and Co oxides", PNAS, vol. 110, No. 29, 2013, pp. 11704-11707.
(Continued)

*Primary Examiner* — Ula C Ruddock
*Assistant Examiner* — Amanda Rosenbaum
(74) *Attorney, Agent, or Firm* — Cantor Colburn LLP

(57) ABSTRACT

A composite cathode active material including: a secondary particle including a plurality of primary particles including a lithium transition metal oxide having a layered crystal structure; and a coating layer disposed on a surface of the secondary particle and between the primary particles of the plurality of primary particles, wherein the coating layer includes a lithium cobalt composite oxide having a spinel crystal structure, and wherein the lithium cobalt composite oxide includes cobalt (Co) and a Group 2 element, a Group 12 element, a Group 13 element, or a combination thereof.

25 Claims, 6 Drawing Sheets

(51) Int. Cl.
*H01M 10/0525* (2010.01)
*H01M 4/131* (2010.01)
*H01M 4/485* (2010.01)
*H01M 4/04* (2006.01)
*H01M 4/525* (2010.01)
*H01M 10/052* (2010.01)
*H01M 4/505* (2010.01)
*H01M 4/02* (2006.01)

(52) U.S. Cl.
CPC ......... *H01M 4/1391* (2013.01); *H01M 4/485* (2013.01); *H01M 4/525* (2013.01); *H01M 10/0525* (2013.01); *H01M 4/505* (2013.01); *H01M 10/052* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 9,705,125 B2 | 7/2017 | Kelder et al. | |
| 9,899,674 B2 | 2/2018 | Hirai et al. | |
| 9,979,014 B2 | 5/2018 | Kim et al. | |
| 2002/0076613 A1* | 6/2002 | Lee | H01M 10/052 429/231.1 |
| 2002/0114995 A1* | 8/2002 | Thackeray | C01G 53/42 429/224 |
| 2003/0180615 A1* | 9/2003 | Johnson | H01M 4/505 429/231.1 |
| 2008/0131782 A1 | 6/2008 | Hagiwara et al. | |
| 2009/0017384 A1 | 1/2009 | Iwasaki et al. | |
| 2011/0171530 A1 | 7/2011 | Esaki et al. | |
| 2012/0282521 A1 | 11/2012 | Choi et al. | |
| 2013/0175469 A1 | 7/2013 | Paulsen et al. | |
| 2013/0274473 A1 | 10/2013 | Che et al. | |
| 2014/0045067 A1* | 2/2014 | Cho | C01G 51/50 429/220 |
| 2014/0087254 A1 | 3/2014 | Li et al. | |
| 2014/0197357 A1* | 7/2014 | Ofer | H01M 4/505 252/182.1 |
| 2014/0377655 A1 | 12/2014 | Mun et al. | |
| 2015/0104708 A1 | 4/2015 | Bi et al. | |
| 2015/0357638 A1* | 12/2015 | Sun | H01M 4/366 429/219 |
| 2015/0380736 A1* | 12/2015 | Park | H01M 4/485 252/182.1 |
| 2016/0013475 A1 | 1/2016 | Ofer et al. | |
| 2016/0181611 A1 | 6/2016 | Cho et al. | |
| 2016/0260965 A1 | 9/2016 | Wu et al. | |
| 2016/0336594 A1 | 11/2016 | Ahn et al. | |
| 2017/0077514 A1 | 3/2017 | Cho et al. | |
| 2017/0309888 A1 | 10/2017 | Yu et al. | |
| 2017/0358779 A1 | 12/2017 | Gunji et al. | |
| 2017/0358797 A1 | 12/2017 | Son et al. | |
| 2017/0358799 A1 | 12/2017 | Gunji et al. | |
| 2018/0026268 A1 | 1/2018 | Kim et al. | |
| 2018/0233740 A1 | 8/2018 | You et al. | |
| 2018/0254511 A1 | 9/2018 | Park et al. | |
| 2019/0006669 A1 | 1/2019 | Park et al. | |
| 2019/0190063 A1* | 6/2019 | Gogyo | H01M 4/625 |

FOREIGN PATENT DOCUMENTS

| | | |
|---|---|---|
| JP | 1999016566 B1 | 1/1999 |
| JP | 2007287569 A | 11/2007 |
| JP | 2009038021 A | 2/2009 |
| JP | 5223166 B2 * | 6/2013 |
| JP | 2013206679 A | 10/2013 |
| KR | 100560534 B1 | 3/2006 |
| KR | 10-0752703 B1 | 8/2007 |
| KR | 1020120121235 A | 11/2012 |
| KR | 1020120124779 A | 11/2012 |
| KR | 1020140047657 A | 4/2014 |
| KR | 101458676 A | 6/2014 |
| KR | 1020140099218 A | 8/2014 |
| KR | 1020150070853 A | 6/2015 |
| KR | 101590441 B1 | 2/2016 |
| KR | 101630209 B1 | 6/2016 |
| KR | 1020160074236 A | 6/2016 |
| KR | 1020160083638 A | 7/2016 |
| KR | 1020160134317 A | 11/2016 |
| KR | 101726530 B1 | 4/2017 |
| KR | 1020170045833 A | 4/2017 |
| KR | 1020170063397 A | 6/2017 |
| KR | 1020180010122 A | 1/2018 |

OTHER PUBLICATIONS

Yang et al, "Intergrown LiNi0.5Mn1.5O4 LiNi1/3Co1/3Mn1/3O2 composite nanorods as high-energy density cathode materials form lithium-ion batteries", Journal of Materials Chemistry A, 1, 2013, pp. 13742-13745.

Jarvis, Karalee A. "The Role of Composition in the Atomic Structure, Oxygen Loss, and Capacity of Layered Li—Mn—Ni oxide Cathodes", Journal of Material Chemistry A. vol. 2, Nov. 2013, pp. 1353-1362 year 2013.

* cited by examiner

COMPOSITE CATHODE ACTIVE MATERIAL, METHOD OF PREPARING THE SAME, AND CATHODE AND LITHIUM BATTERY INCLUDING THE COMPOSITE CATHODE ACTIVE MATERIAL

CROSS-REFERENCE TO RELATED APPLICATION

This application claims priority to and the benefit of Korean Patent Application No. 10-2017-0110344, filed on Aug. 30, 2017, and Korean Patent Application No. 10-2018-0089504, filed on Jul. 31, 2018, in the Korean Intellectual Property Office, and all the benefits therefrom under 35 U.S.C. § 119, the contents of which are incorporated herein in their entireties by reference.

BACKGROUND

1. Field

The present disclosure relates to a composite cathode active material, a method of preparing the composite cathode active material, and a cathode and a lithium battery including the composite cathode active material.

2. Description of the Related Art

In order to manufacture various devices of a small size and exhibiting high performance, it has become important to manufacture a lithium battery with a high energy density, a small size, and a light weight. A nickel-containing cathode active material having a high capacity has been studied in order to manufacture a lithium battery having the characteristics described above.

Lifetime characteristics of a currently available nickel-containing cathode active material deteriorate due to side reactions caused by mixing a high surface residue lithium amount and a cation, and due to the unsatisfactory thermal stability of the current nickel-based cathode active material. Thus there remains a need for an improved cathode active material having improved capacity and lifetime characteristics.

SUMMARY

Provided is a composite cathode active material having a reduced surface residual lithium amount and improved thermal stability.

Provided is a cathode including the composite cathode active material.

Provided is a lithium battery having an improved lifetime and improved cell capacity by including the cathode.

Provided is a method of preparing the composite cathode active material.

Additional aspects will be set forth in part in the description which follows and, in part, will be apparent from the description, or may be learned by practice of the presented embodiments.

According to an aspect of an embodiment, a composite cathode active material includes: a secondary particle including a plurality of primary particles including a lithium transition metal oxide having a layered crystal structure; and a coating layer disposed on a surface of the secondary particle and between primary particles of the plurality of primary particles, the coating layer including a lithium cobalt composite oxide having a spinel crystal structure, wherein the lithium cobalt composite oxide includes cobalt (Co), and a Group 2 element, a Group 12 element, a Group 13 element, or a combination thereof.

According to an aspect of another embodiment, a cathode includes the composite cathode active material.

According to an aspect of another embodiment, a lithium battery includes the cathode, an anode, and an electrolyte between the cathode and the anode.

According to an aspect of another embodiment, a method of preparing the composite cathode active material includes: obtaining a lithium transition metal oxide having a layered crystal structure; mixing the lithium transition metal oxide having a layered crystal structure with a precursor of a lithium cobalt composite oxide having a spinel crystal structure and containing cobalt (Co) and a Group 2 element, a Group 12 element, a Group 13 element, or a combination thereof to prepare a composite cathode active material composition; drying the composite cathode active material composition, and heat-treating the dried composite cathode active material composition at a temperature in a range of about 400° C. to about 1000° C. under an oxidizing gas atmosphere to prepare the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
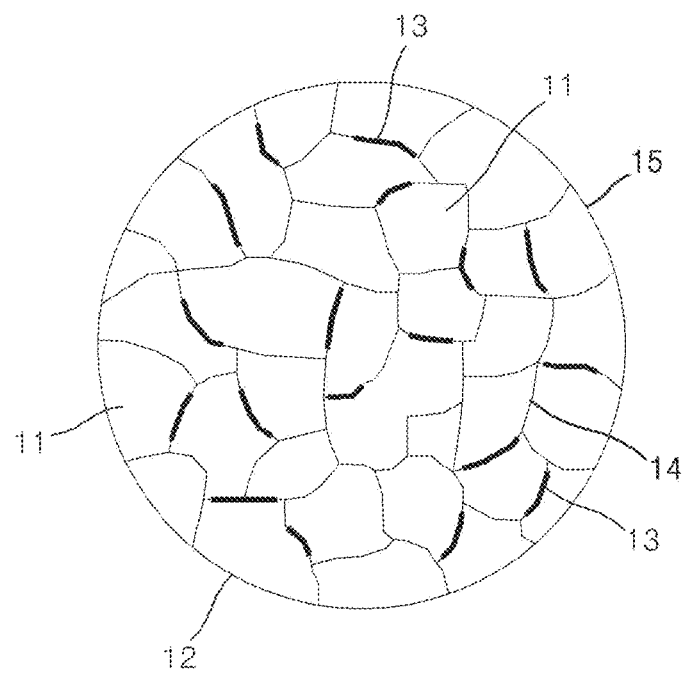
FIG. 1A is a schematic view of a structure of an embodiment of a composite cathode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element such as a layer, film, region, or substrate, is referred to as being "on" another element, it can be directly on the other element or intervening elements may also be present. In contrast, when an element is referred to as being "directly on" another element, there are no intervening elements present. It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can, therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to exemplary embodiments, a composite cathode active material, a method of preparing the same, and a cathode and a lithium battery including the composite cathode active material will be described in further detail.

Provided is a composite cathode active material including a secondary particle including a plurality of primary particles comprising a lithium transition metal oxide having a layered crystal structure; and a coating layer disposed on a surface of the secondary particle and between the primary particles, wherein the coating layer comprises a lithium cobalt composite oxide having a spinel structure and containing cobalt (Co) and a Group 2 element, Group 12 element, a Group 13 element, or a combination thereof.

The coating layer may be present in a grain boundary between adjacent primary particles and on the surface of the secondary particle. As used herein, the term "between primary particles" may be interpreted as a region including both grain boundaries of the primary particle and a surface of the primary particles.

In this regard, the coating layer including the lithium cobalt composite oxide is present between a surface of the secondary particle and grain boundaries of the primary particles, and thus conductivity of lithium ions may be improved. Also, residual lithium amount on a surface of the composite cathode active material is reduced, which, while not wanting to be bound by theory, is understood to suppresses deterioration of the composite cathode active material and reduce gas generation, and thus the thermal stability of a lithium battery may be improved. When the coating layer is present in the grain boundary between adjacent primary particles, the coating layer reduces a volume change caused by charging and discharging of the primary particles. Reducing the volume change is understood to suppress cracks which would otherwise form in the primary particles, thereby suppressing deterioration of the mechanical strength of the composite cathode active material, even after long-term charging and discharging of the lithium battery. Also, a side reaction between the nickel-containing lithium-transition metal oxide having a layered crystal structure and the electrolyte can be effectively suppressed and an internal resistance of the lithium battery can be reduced, thereby improving cycle characteristics of the lithium battery.

In the present specification, the coating layer may be a continuous layer or a non-continuous layer, such as a layer in the form of an island on a surface of the primary particle.

The lithium cobalt composite oxide having a spinel crystal structure and containing cobalt (Co) and a transition metal (M) may be a compound represented by Formula 1.

$$Li_xCo_aMe_bO_{4+\delta}$$ Formula 1

In Formula 1, Me may is a Group 2 element, a Group 12 element, a Group 13 element, or a combination thereof; and $1.0 \leq x \leq 1.1$, $0 < a < 2$, $0 < b < 2$, $0 < a+b \leq 2$, and $-1.5 \leq \delta \leq 0$.

In Formula 1, for example, x may be in a range of about 1.0 to about 1.09; a is in a range of about 0.4 to about 1.6; and b is in a range of about 0.4 to about 1.6. Also, for example, the sum of a and b may be 2. In formula 1, $0.1 < a+b \leq 2$, for example $0.2 < a+b \leq 2$, for example, $0.5 < a+b \leq 2$, for example, $1 < a+b \leq 2$.

In Formula 1, M is aluminum (Al), gallium (Ga), magnesium (Mg), calcium (Ca), barium (Ba), zinc (Zn), or a combination thereof.

The compound of Formula 1 may be, for example, $Li_xCo_aAl_bO_{4+\delta}$, $Li_xCo_aZn_bO_{4+\delta}$, $Li_xLiCo_aMg_bO_{4+\delta}$, $Li_xCo_aGa_bO_{4+\delta}$, $Li_xCo_aCa_bO_{4+\delta}$, or $Li_xCo_aBa_bO_{4+\delta}$. In an embodiment of Formula 1, $1.0 \leq x \leq 1.1$, $0 < a < 2$, $0 < b < 2$, $0 < a+b \leq 2$, and $-1.5 \leq \delta \leq 0$. In the compound, for example, x may be in a range of about 1.0 to about 1.09; a may be in a range of about 0.4 to about 1.6; and b may be in a range of about 0.4 to about 1.6.

The compound of Formula 1 may be, for example, $LiCo_{1.5}Al_{0.5}O_{4+\delta}$ (where $-0.5 \leq \delta \leq 0$), $LiCo_{1.5}Ga_{0.5}O_{4+\delta}$ (where $-0.5 \leq \delta \leq 0$), $LiCo_{1.33}Zn_{0.67}O_{4+\delta}$ (where $-0.835 \leq \delta \leq 0$), $LiCo_{1.33}Ca_{0.67}O_{4+\delta}$ (where $-0.835 \leq \delta \leq 0$), $LiCo_{1.33}Ba_{0.67}O_{4+\delta}$ (where $-0.835 \leq \delta \leq 0$), $LiCo_{1.33}Ga_{0.67}O_{4+\delta}$ (where $-0.835 \leq \delta \leq 0$), $LiCo_{1.2}Mg_{0.8}O_{4+\delta}$ (where $-0.9 \leq \delta \leq 0$), $LiCo_{1.2}Ga_{0.8}O_{4+\delta}$ (where $-0.9 \leq \delta \leq 0$), $LiCo_{1.2}Ca_{0.8}O_{4+\delta}$ (where $-0.9 \leq \delta \leq 0$), $LiCo_{1.2}Ba_{0.8}O_{4+\delta}$ (where $-0.9 \leq \delta \leq 0$), $LiCo_{1.2}Zn_{0.8}O_{4+\delta}$ (where $-0.9 \leq \delta \leq 0$), $LiCo_{1.6}Mg_{0.4}O_{4+\delta}$ (where $-0.7 \leq \delta \leq 0$), $LiCo_{1.6}Ga_{0.4}O_{4+\delta}$ (where $-0.7 \leq \delta \leq 0$), $LiCo_{1.6}Ca_{0.4}O_{4+\delta}$ (where $-0.7 \leq \delta \leq 0$), $LiCo_{1.6}Ba_{0.4}O_{4+\delta}$ (where $-0.7 \leq \delta \leq 0$), $LiCo_{1.6}Zn_{0.4}O_{4+\delta}$ (where $-0.7 \leq \delta \leq 0$), $LiCo_{0.8}Mg_{1.2}O_{4+\delta}$ (where $-1.1 \leq \delta \leq 0$), $LiCo_{0.8}Ga_{1.2}O_{4+\delta}$ (where $-1.1 \leq \delta \leq 0$), $LiCo_{0.8}Ca_{1.2}O_{4+\delta}$ (where $-1.1 \leq \delta \leq 0$), $LiCo_{0.8}Ba_{1.2}O_{4+\delta}$ (where $-1.1 \leq \delta \leq 0$), $LiCo_{0.8}Zn_{1.2}O_{4+\delta}$ (where $-1.1 \leq \delta \leq 0$), $LiCo_{0.4}Mg_{1.6}O_{4+\delta}$ (where $-1.3 \leq \delta \leq 0$), $LiCo_{0.4}Ga_{1.6}O_{4+\delta}$ (where $-1.3 \leq \delta \leq 0$), $LiCo_{0.4}Ca_{1.6}O_{4+\delta}$ (where $-1.3 \leq \delta \leq 0$), $LiCo_{0.4}Ba_{1.6}O_{4+\delta}$ (where $-1.3 \leq \delta \leq 0$), or $LiCo_{0.4}Zn_{1.6}O_{4+\delta}$ (where $-1.3 \leq \delta \leq 0$). A combination comprising at least two of the foregoing may be used.

The compound of Formula 1 may be, for example, $LiCo_{1.5}Al_{0.5}O_{4+\delta}$ (where $-0.5 \leq \delta \leq 0$), $LiCo_{1.33}Zn_{0.67}O_{4+\delta}$ (where $-0.835 \leq \delta \leq 0$), $LiCo_{1.2}Mg_{0.8}O_{4+\delta}$ (where $-0.9 \leq \delta \leq 0$), $LiCo_{1.6}Mg_{0.4}O_{4+\delta}$ (where $-0.7 \leq \delta \leq 0$), $LiCo_{0.8}Mg_{1.2}O_{4+\delta}$ (where $-1.1 \leq \delta \leq 0$), or $LiCo_{0.4}Mg_{1.6}O_{4+\delta}$ (where $-1.3 \leq \delta \leq 0$). A combination comprising at least two of the foregoing may be used.

The lithium transition metal oxide having a layered crystal structure may have a rock-salt layered structure (for example, a structure belonging to space group R-3m), and the lithium cobalt composite oxide having a spinel crystal structure and containing cobalt (Co) and a Group 2 element, Group 12 element, a Group 13 element, or a combination thereof (M) may belong to space group Fd-3m. When the oxides have these crystal structures, cycle characteristics and thermal stability of a lithium battery including the composite cathode active material may be improved.

As used herein, the term "a grain boundary" refers to an interface between two adjacent primary particles. Here, the interface between the primary particles is present in a secondary particle.

As used herein, the term "primary particle" refers to a particle that agglomerates to form a secondary particle, and the primary particles may have any suitable shape, including a rod-shape, or a rectangular shape.

As used herein, the term "a secondary particle" refers to a particle that comprises a plurality of primary particles and is not an agglomerate of other particles. The secondary particle may have a spherical shape.

FIG. 1A is a cross-sectional view that illustrates a fine structure of a secondary particle 12 in a composite cathode active material for a lithium battery, according to an embodiment.

Referring to FIG. 1A, a plurality of primary particles 11 are agglomerated to form a secondary particle 12, and a coating layer 13 is disposed between the primary particles 11, for example, at the grain boundary 14 of the primary particles 11 and/or on a surface 15 of the secondary particle 12.

In the composite cathode active material, an amount of nickel in the lithium transition metal oxide may be about 70 mol % or greater, about 80 mol % or greater, about 90 mol % or greater, or, for example, about 95 mol % or greater, or about 70 mol % to about 99.9 mol %, or about 80 mol % to about 95 mol %, based on a total content of the transition metals of the lithium transition metal oxide, including the nickel. When the amount of nickel in the lithium transition metal oxide is within these ranges, a lithium battery having improved capacity may be manufactured.

In the composite cathode active material, the coating layer including the lithium cobalt composite oxide having a spinel crystal structure and containing cobalt and a Group 2 element, a Group 12 element, a Group 13 element, or a combination thereof may be distributed throughout an entirety of the composite cathode active material and at a uniform concentration. The lithium cobalt composite oxide may have a concentration gradient, e.g., a concentration gradient in a direction from a center portion to a surface portion of the composite cathode active material. For example, a concentration of the lithium cobalt composite oxide in the center portion of the composite cathode active material may be less than a concentration of the lithium cobalt composite oxide in the surface portion, and a concentration of the lithium cobalt composite oxide may be greater in the surface portion of the composite cathode active material than in the center portion. Alternatively, a concentration of the lithium cobalt composite oxide in the center portion of the composite cathode active material is greater than a concentration of the lithium cobalt composite oxide in the surface portion.

An amount of the lithium cobalt composite oxide or a total amount of cobalt and metal (M) in the coating layer may be in a range of about 0.05 parts to about 30 parts by weight, for example, about 0.1 parts to about 20 parts by weight, for example, about 0.1 parts to about 10 parts by weight, about 0.1 parts to about 2 parts by weight, or, for example, about 0.25 parts to about 1.5 parts by weight, based on 100 parts by weight of the lithium transition metal oxide having a layered crystal structure.

In the coating layer, an amount of Li and Co may be in a range of about 0.01 parts to about 20 parts by weight, for example, about 0.1 parts to about 10 parts by weight, about 0.1 parts to about 2 parts by weight, or, for example, about 0.25 parts to about 1.5 parts by weight, based on 100 parts by weight of the lithium transition metal oxide having a layered crystal structure. When the amounts of lithium cobalt composite oxide and Li and Co are within these ranges, a composite cathode active material may have improved thermal stability and a decreased amount of surface residual lithium. When this composite cathode active material is used, a lithium battery having improved charge/discharge characteristics and lifetime characteristics may be manufactured.

In some embodiments, in the lithium cobalt composite oxide of the coating layer, the total amount of cobalt and metal (M) of Formula 1 may be in a range of about 0.01 parts to about 20 parts by weight, for example, about 0.1 parts to about 10 parts by weight, about 0.1 parts to about 2 parts by weight, or, for example, about 0.25 parts to about 1.5 parts by weight, based on 100 parts by weight of the lithium transition metal oxide having a layered crystal structure.

A mixed phase may exist between the lithium transition metal oxide having a layered crystal structure and the coating layer. The mixed phase may denote a mixed structure of a layered crystal structure and a spinel crystal structure.

An amorphous structure, a layered crystal structure, or a combination thereof may be further included between the primary particles.

The lithium transition metal oxide having a layered crystal structure may be at least one compound represented by Formulae 2 to 4.

$$Li_xCo_{1-y}M_yO_{2-\alpha}X_\alpha \quad \text{Formula 2}$$

$$Li_xNi_{1-y}Me_yO_{2-\alpha}X_\alpha \quad \text{Formula 3}$$

$$Li_xNi_{1-y-z}Mn_yMa_zO_{2-\alpha}X_\alpha \quad \text{Formula 4}$$

In Formulae 2 to 4, 0.95≤x≤1.1, 0≤y≤0.9, 0<z≤0.2, and 0≤α≤2; M is Ni, Mn, Zr, Al, Mg, Ag, Mo, Ti, V, Cr, Fe, Cu, B, or a combination thereof; Me is Co, Zr, Al, Mg, Ag, Mo, Ti, V, Cr, Mn, Fe, Cu, B, or a combination thereof; Ma is Co, Zr, Al, Mg, Ag, Mo, Ti, V, Cr, Fe, Cu, B, or a combination thereof; and X is F, S, P, or a combination thereof.

In Formulae 2 to 4, x is in a range of about 1.03 to about 1.09, or, for example, about 1.03, 1.06, or 1.09.

The lithium transition metal oxide having a layered crystal structure may be at least one compound represented by Formulae 5 to 7.

$$Li[Li_{1-a}Me_a]O_{2+d} \quad \text{Formula 5}$$

In Formula 5, 0.85≤a<1 and 0≤d≤0.1; and Me is Ni, Co, Mn, Al, V, Cr, Fe, Zr, Re, B, Ge, Ru, Sn, Ti, Nb, Mo, Pt, or a combination thereof.

$$Li[Li_{1-x-y-z}Ma_xMb_yMc_z]O_{2+d} \quad \text{Formula 6}$$

In Formula 6, 0.8≤x+y+z<1, 0<x<1, 0<y<1, 0<z<1, and 0≤d≤0.1; and Ma, Mb, and Mc are each independently Mn, Co, Ni, Al, or a combination thereof.

$$Li[Li_{1-x-y-z}Ni_xCo_yMn_z]O_{2+d} \quad \text{Formula 7}$$

In Formula 7, 0.8≤x+y+z<1; 0<x<1, 0<y<1, 0<z<1, and 0≤d≤0.1.

The lithium transition metal oxide may be a compound represented by Formula 8.

$$aLi_2MnO_3-(1-a)LiMO_2 \quad \text{Formula 8}$$

In Formula 8, 0<a<1; and
M is nickel (Ni), cobalt (Co), manganese (Mn), vanadium (V), chrome (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof.

The lithium transition metal oxide having a layered crystal structure and may be a compound represented by Formula 9.

$$Li_xNi_{1-y-z}M_yCo_zO_2 \quad \text{Formula 9}$$

In Formula 9, 0.95≤x≤1.1, 0≤y≤0.2, 0<z≤0.2, and 0.7≤1-y-z≤0.99; and M is manganese (Mn), aluminum (Al), titanium (Ti), calcium (Ca), or a combination thereof.

In Formula 9, 1-y-z is, for example, in a range of about 0.8 to about 0.99.

The lithium transition metal oxide having a layered crystal structure may be a compound represented by Formula 9a.

$$Li_xNi_{1-y-z}Mn_yCo_zO_2 \quad \text{Formula 9a}$$

in Formula 9a, 0.80≤x≤1.1, 0≤y≤0.2, 0<z≤0.2, and 0.85≤1-y-z≤0.99.

In Formulae 5 to 9, x is in a range of about 1.03 to about 1.09, or, for example, about 1.03, 1.06, or 1.09.

The lithium transition metal oxide may be, for example, $Li_{1.03}[Ni_{0.9}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.15}Mn_{0.05}]O_2$, $Li_{1.06}[Ni_{0.85}Co_{0.10}Mn_{0.05}]O_2$, $Li_{1.06}[Ni_{0.91}Co_{0.05}Mn_{0.04}]O_2$, $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, or $Li_{1.09}[Ni_{0.91}Co_{0.05}Mn_{0.04}]O_2$. A combination comprising at least one of the foregoing may be used.

In the composite cathode active material, an average particle diameter of the primary particles may be in a range of about 0.1 micrometers (μm) to about 5 μm, or, for example, about 0.2 μm to about 0.5 μm, but embodiments are not limited thereto. An average particle diameter of the primary particles within these ranges may improve charge/discharge characteristics of a lithium battery.

In the composite cathode active material, an average particle diameter of the secondary particle of the primary particles may be in a range of about 1 μm to about 30 μm, about 10 μm to about 20 μm, or, for example, about 13 μm to about 15 μm, but embodiments are not limited thereto. An average particle diameter of the secondary particle within these ranges may improve charge/discharge characteristics of a lithium battery.

In the composite cathode active material, a thickness of the coating layer may be about 1 μm or less, about 500 nanometers (nm) or less, about 200 nm or less, about 100 nm or less, about 50 nm or less, about 30 nm or less, or, for example, about 10 nm or less, or or about 10 nm to about 1 μm, about 30 nm to about 200 nm, or about 30 nm to about 100 nm. When the thickness of the coating layer is within these ranges, cycle characteristics and thermal stability of a lithium battery including the composite cathode active material may be improved.

In an embodiment, the grain boundaries of the composite cathode active material may have an average grain boundary length in a range of about 50 nm to about 1000 nm, or about 100 nm to about 500 nm, and an average grain boundary thickness in a range of about 1 nm to about 200 nm, or about 5 nm to about 100 nm. A direction of the grain boundary lengths may be parallel to a surface of the adjacent primary particle, and a direction of the thicknesses may be perpendicular to a surface of the adjacent primary particle. The average grain boundary length may be in a range of about 50 nm to about 950 nm, about 100 nm to about 900 nm, about 150 nm to about 800 nm, or, for example, about 200 nm to about 700 nm. For example, the average grain boundary thickness may be in a range of about 2 nm to about 100 nm, about 5 nm to about 100 nm, about 10 nm to about 100 nm, or about 20 nm to about 100 nm. When the average grain boundary length and the average grain boundary thickness are within these ranges, charge/discharge characteristics may be improved.

According to another embodiment, a method of preparing a composite cathode active material includes: obtaining a lithium transition metal oxide having a layered crystal structure; mixing the lithium transition metal oxide having a layered crystal structure with a precursor of a lithium cobalt composite oxide having a spinel crystal structure and containing cobalt (Co) and a Group 2 element, a Group 12 element, a Group 13 element, or a combination thereof to prepare a composite cathode active material composition; and drying and heat-treating the composite cathode active material composition at a temperature in a range of higher than about 400° C. to about 1000° C. or lower under an oxidizing gas atmosphere.

The mixing of the lithium transition metal oxide having a layered crystal structure with the precursor of a lithium cobalt composite oxide having a spinel crystal structure and containing cobalt (Co) and a Group 2 element, a Group 12 element, a Group 13 element, or a combination thereof, may be wet-mixing in the presence of a solvent.

The oxidizing gas atmosphere may be prepared by using oxygen or air, and may comprise oxygen, air, or a combination thereof, e.g., air having an increased content of oxygen.

In the composite cathode active material composition, the total amount of the precursor of a lithium cobalt composite oxide having a spinel crystal structure and containing cobalt (Co) and a Group 2 element, Group 12 element, a Group 13 element, or a combination thereof (M) and the solvent may be about 300 parts by weight or less, based on 100 parts by weight of the lithium transition metal oxide having a layered crystal structure. The amount of the precursor of a lithium cobalt composite oxide having a spinel crystal structure and containing cobalt (Co) and a Group 2 element, Group 12 element, a Group 13 element, or a combination thereof (M) may be about 100 parts by weight or less, based on 100 parts by weight of the lithium transition metal oxide having a layered crystal structure. Also, the amount of the solvent may be about 200 parts by weight or less, based on 100 parts by weight of the lithium transition metal oxide having a layered crystal structure.

The heat-treating of the composite cathode active material composition may be performed at a temperature in a range of about 600° C. to about 800° C., or, for example, about 700° C. to about 750° C. In the heat-treating process, a temperature increasing rate may be, for example, in a range of about 1° C. per minute (° C./min) to about 10° C./min. The temperature increasing rate may be maintained in a range of about 1° C./min to about 10° C./min, or, for example, 2° C./min to reach the heat-treating temperature. When the heat-treating temperature and the temperature increasing rate are within these ranges, a coating layer including a lithium cobalt composite oxide having a spinel crystal structure and containing cobalt (Co) and a Group 2 element, a Group 12 element, a Group 13 element, or a combination thereof, may be on a surface of the secondary particle and between the primary particles.

The precursor of a lithium cobalt composite oxide may be obtained by mixing a cobalt precursor and an M precursor to prepare a mixture; and by adding a solvent to the mixture to prepare a precursor mixture. The precursor mixture may be mixed with a lithium transition metal oxide having a layered crystal structure and then precipitated to obtain a lithium transition metal oxide having a layered crystal structure, where a coating layer may be on the nickel-containing lithium transition metal oxide. Thereafter, the lithium transition metal oxide may be heat-treated to prepare a composite cathode active material according to an embodiment.

Examples of the cobalt precursor may include a cobalt chloride, a cobalt nitrate, and a cobalt sulfate, and examples of the M precursor may be various and the same as those of the cobalt precursor, except that the M precursor includes M instead of cobalt. A caloric value of the composite cathode active material according to an embodiment may be about 90% or less of the secondary particle including the lithium transition metal oxide having a layered crystal structure. Also, a residual lithium content of the composite cathode active material may be 90% or less of a residual lithium content of the secondary particle comprising the nickel-containing_lithium transition metal oxide having a layered crystal structure.

Also, an amount of lithium remaining on a surface before surface-treatment for removing residual lithium of the composite cathode active material may be, about 4,000 parts per million (ppm), which may be reduced to about 2,000 ppm or lower after the surface-treatment. Also, the composite cathode active material may have a cell capacity of 220 milliamp hours per gram (mAh/g) and an excellent lifetime of 50 cycles or more.

Also, the lithium cobalt composite oxide having a spinel crystal structure and containing cobalt (Co) and a Group 2 element, a Group 12 element, a Group 13 element, or a combination thereof may cover greater than or equal to about 50% of a surface of the lithium transition metal oxide. When the composite cathode active material has this structure, a side reaction between the lithium transition metal oxide and an electrolyte solution may be substantially reduced and/or effectively minimized, or effectively prevented.

According to another embodiment, a cathode may include the composite cathode active material.

First, a cathode may be prepared. The composite cathode active material, a conducting agent, a binder, and a solvent are mixed together to prepare a cathode active material composition. The cathode active material composition may be directly coated on an aluminum current collector to prepare a cathode having a cathode active material layer. In some embodiments, the cathode active material composition may be cast on a separate support to form a cathode film, which may then be separated from the support and laminated on an aluminum current collector to prepare a cathode having a cathode active material layer.

The conducting agent may be carbon black, graphite particulate, natural graphite, artificial graphite, acetylene black, or Ketjen black; carbon fiber; carbon nanotube; a metal powder, metal fiber, or metal tubes of copper, nickel, aluminum, or silver; or a conducting polymer such as a polyphenylene derivative, but embodiments are not limited thereto. Any suitable material available as a conducting agent in the art may be used.

Examples of the binder include a vinylidene fluoride/hexafluoropropylene copolymer, polyvinylidene fluoride (PVDF), polyacrylonitrile, polymethyl methacrylate, polytetrafluoroethylene (PTFE), mixtures thereof, and a styrene butadiene rubber polymer, but embodiments are not limited thereto. Any material available as a binding agent in the art may be used. Examples of the solvent include N-methylpyrrolidone (NMP), acetone, or water, but embodiments are not limited thereto. Any suitable material available as a solvent in the art may be used.

The amounts of the composite cathode active material, the conducting agent, the binder, and the solvent may be in ranges that are used in lithium secondary batteries. At least one of the conducting agent, the binder, and the solvent may be omitted according to the use and the structure of the lithium secondary battery.

The cathode may include a second cathode active material in addition to the composite cathode active material.

The second cathode active material is a lithium-containing metal oxide, and may be any suitable material available as a cathode active material in the art. For example, in some embodiments, the second cathode active material may be a composite oxide of lithium with Co, Mn, Ni, or a combination thereof. In some embodiments, the second cathode active material may be a compound represented by the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}CO_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2GbO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. A combination comprising at least one of the foregoing may be used.

In the formulae above, A may be selected from nickel (Ni), cobalt (Co), manganese (Mn), and a combination thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and a combination thereof; D may be selected from oxygen (O), fluorine (F), sulfur (S), phosphorus (P), and a combination thereof; E may be selected from cobalt (Co), manganese (Mn), and a combination thereof; F' may be selected from fluorine (F), sulfur (S), phosphorus (P), and a combination thereof; G may be selected from aluminum (Al), chromium (Cr), manganese (Mn), iron (Fe), magnesium (Mg), lanthanum (La), cerium (Ce), strontium (Sr), vanadium (V), and a combination thereof; Q is selected from titanium (Ti), molybdenum (Mo), manganese (Mn), and a combination thereof; I' is selected from chromium (Cr), vanadium (V), iron (Fe), scandium (Sc), yttrium (Y), and a combination thereof; and J may be selected from vanadium (V), chromium (Cr), manganese (Mn), cobalt (Co), nickel (Ni), copper (Cu), and a combination thereof.

The compounds listed above as cathode active materials may have a surface coating layer (hereinafter, also referred to as "coating layer"). Alternatively, the compounds may have a mixture of a compound without a coating layer and a compound having a coating layer. In some embodiments, the coating layer may include an oxide, hydroxide, oxyhydroxide, oxycarbonate, hydroxycarbonate, or a combination thereof of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

According to another embodiment, the cathode may be prepared by using the composite cathode active material according to an embodiment as a large-particle cathode active material together with a small-particle cathode active material. In this regard, the cathode may include a bimodal cathode active material.

According to another embodiment, a lithium battery may include a cathode including the composite cathode active material; an anode; and an electrolyte between the cathode and the anode. The lithium battery may be prepared in the following manner.

First, a cathode is prepared by the cathode preparation method described above.

Next, an anode is prepared as follows. The anode may be prepared in the same manner as the cathode, except that an anode active material is used instead of a composite cathode active material. Also, the same conducting agent, binder, and solvent used in the preparation of the cathode may be used in the preparation of an anode active material composition.

For example, an anode active material, a conducting agent, a binder, and a solvent are mixed together to prepare an anode active material composition. The anode active material composition may be directly coated on a copper current collector to prepare an anode plate. In some embodiments, the anode active material composition may be cast on a separate support to form an anode active material film, which may then be separated from the support and laminated on a copper current collector to prepare an anode plate (or an anode).

The anode active material may be any material that is generally used in the art. Examples of the anode active material may include a lithium metal, an element that is alloyable with lithium, a transition metal oxide, a non-transition metal oxide, a carbonaceous material, or a combination thereof.

For example, the element alloyable with lithium may be Si, Sn, Al, Ge, Pb, Bi, Sb, an Si—Y' alloy (where Y' is an alkali metal, an alkaline earth metal, a Group 13 to a Group 16 element, a transition metal, a rare earth element, or a combined element thereof, and is not Si), or an Sn—Y' alloy (where, Y' is an alkali metal, an alkaline earth metal, a Group 13 to a Group 16 element, a transition metal, a rare earth element, or a combined element thereof, and is not Sn). Examples of the element Y' may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (where, $0 < x < 2$).

The carbonaceous material may be crystalline carbon, amorphous carbon, or a mixture thereof. Examples of the crystalline carbon may include natural graphite and artificial graphite, each of which has an amorphous shape, a plate shape, a flake shape, a spherical shape, or a fiber shape.

Examples of the amorphous carbon may include soft carbon (carbon calcined at a low-temperature), hard carbon, mesophase pitch carbonization products, and calcined cokes.

Amounts of the anode active material, the conducting agent, the binder, and the solvent may be the same as those used in a commercial lithium secondary battery.

Next, a separator to be disposed between the cathode and the anode is prepared. The separator for the lithium battery may be any separator that is commonly used in lithium batteries. In some embodiments, the separator may have low resistance to migration of ions in an electrolyte and have an excellent electrolyte-retaining ability. Examples of the separator are glass fiber, polyester, Teflon, polyethylene, polypropylene, PTFE, and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some embodiments, a polymer, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer used to manufacture the separator may be any material that is commonly used as a binder for electrode plates. Examples of the polymer are a vinylidenefluoride/hexafluoropropylene copolymer, PVDF, polyacrylonitrile, polymethyl methacrylate, and a mixture thereof.

Then, an electrolyte is prepared.

In some embodiments, the electrolyte may be an organic electrolyte. In some embodiments, the electrolyte may be in a solid phase. Examples of the electrolyte are lithium oxide and lithium oxynitride. Any material available as a solid electrolyte in the art may be used. In some embodiments, the solid electrolyte may be formed on the anode by, for example, sputtering.

In some embodiments, the organic electrolyte may be prepared by dissolving a lithium salt in an organic solvent.

The organic solvent may be any solvent available as an organic solvent in the art. In some embodiments, the organic solvent may be ethylene carbonate, fluoroethylene carbonate, propylene carbonate, butylene carbonate, dimethyl carbonate, diethyl carbonate, dipropyl carbonate, dibutyl carbonate, methylethyl carbonate, methylpropyl carbonate, methylisopropyl carbonate, ethylpropyl carbonate, benzonitrile, acetonitrile, tetrahydrofuran, 2-methyltetrahydrofuran, γ-butyrolactone, dioxolane, 4-methyldioxorane, N,N-dimethyl formamide, dimethyl acetamide, dimethyl sulfoxide, dioxane, 1,2-dimethoxyethane, sulforane, dichloroethane, chlorobenzene, nitrobenzene, diethylene glycol, dimethyl ether, or a mixture thereof.

In some embodiments, the lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Figure 4:
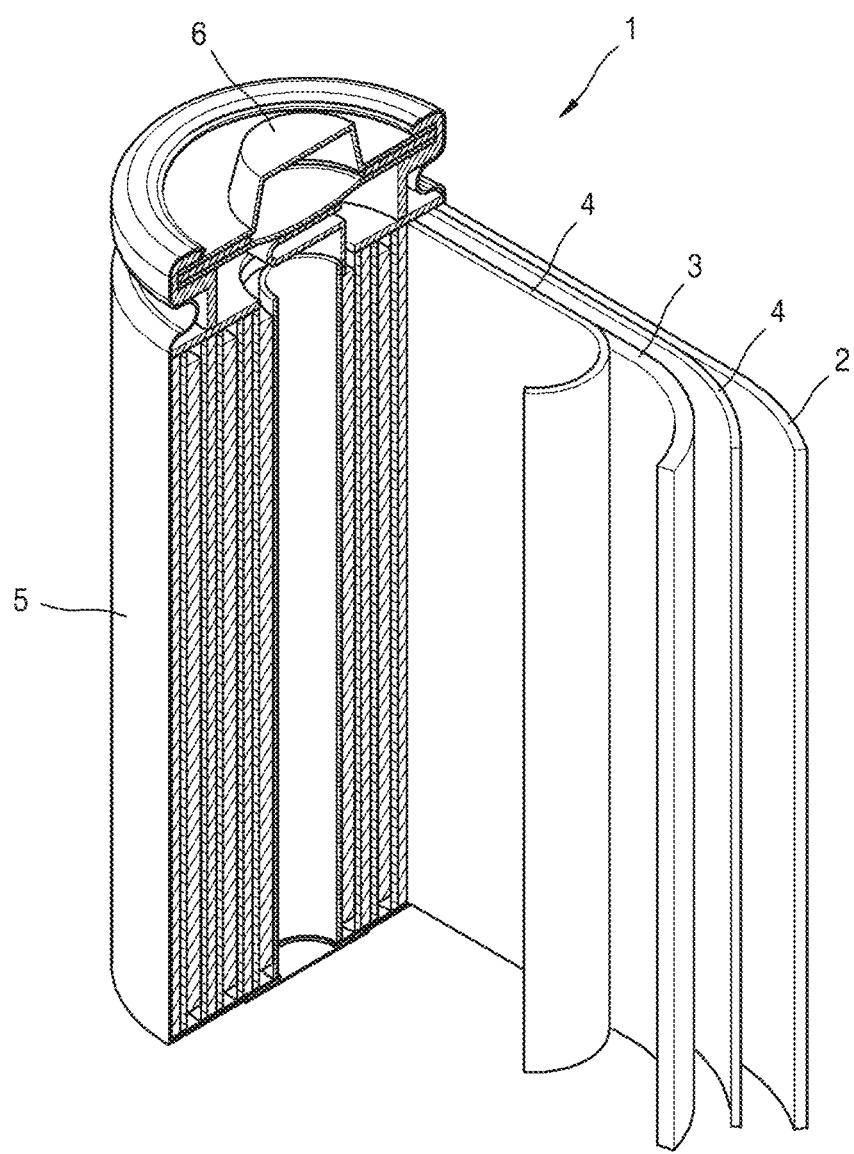
FIG. 4 is a schematic view of a structure of an embodiment of a lithium battery including a cathode including the composite cathode active material.

Referring to FIG. 4, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolyte and sealed with a cap assembly 6, thereby completing the manufacture of the lithium battery 1. In some embodiments, the battery case 5 may be a cylindrical type, a rectangular type, or a thin-film type. For example, the lithium battery 1 may be a large-sized, thin-film type battery. In some embodiments, the lithium battery 1 may be a lithium ion battery.

In some embodiments, the separator 4 may be disposed between the cathode 3 and the anode 2 to form a battery assembly. In some embodiments, the battery assembly may be stacked in a bi-cell structure and impregnated with the electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery 1 may have improved lifetime characteristics and high-rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

The lithium battery may be charged to a voltage of greater than or equal to about 4.5 volts (V) with respect to lithium metal at the initial charging state to activate the spinel crystal structure belonging to space group Fd-3m including a second lithium transition metal oxide of a shell (for example, the coating film). Thus additional charge capacity and discharge capacity can be utilized. Therefore, the initial charge-discharge capacity of the lithium battery may be improved.

Hereinafter, an embodiment will now be described in more detail with reference to the following examples. However, these examples are provided herein for illustrative purpose only and not intended to limit the scope of the one or more embodiments.

EXAMPLES

Comparative Example 1: Preparation of Lithium Transition Metal Oxide $NiSO_4(H_2O)_6$, $CoSO_4$, and $MnSO_4 \cdot H_2O$ were added to water at a molar ratio of 91:6:3 to prepare an aqueous precursor solution. While stirring the aqueous solution, a sodium hydroxide aqueous solution was slowly added thereto to neutralize the aqueous precursor solution to prepare a precipitate. The precipitate was filtered, washed, and dried at 120° C. to prepare a metal hydroxide $(Ni_{0.8}Co_{0.15}Mn_{0.05}(OH)_2)$ powder.

The metal hydroxide powder was mixed with LiOH, put into a furnace, and heat-treated in a stream of flowing oxygen at 765° C. for 20 hours to prepare a lithium transition metal oxide $(Li_{1.05}Ni_{0.91}Co_{0.06}Mn_{0.03}O_2)$.

Comparative Example 2: Preparation of Nickel-Containing Lithium Transition Metal Oxide A lithium transition metal oxide $(Li_{1.09}Ni_{0.878}Co_{0.080}Mn_{0.04}Al_{0.002}O_2)$ was prepared in the same manner as in Comparative Example 1, except that $NiSO_4(H_2O)_6$, $CoSO_4$, $MnSO_4 \cdot H_2O$, and $Al(NO_3)_3 \cdot 9H_2O$ were mixed at a molar ratio of 87.8:8:4:0.2 and heat-treated at 710° C. for 40 hours, and an amount of LiOH was controlled to obtain the lithium transition metal oxide ($Li_{1.09}Ni_{0.878}Co_{0.080}Mn_{0.040}Al_{0.002}O_2$).

Comparative Example 3: Preparation of Composite Cathode Active Material 0.75 parts by weight of $CoCl_2.H_2O$ was prepared, added to 10 parts by weight of distilled water, and stirred at room temperature (25° C.) for 1 minute to prepare an aqueous solution.

100 parts by weight of the $Li_{1.05}Ni_{0.91}Co_{0.06}Mn_{0.03}O_2$ powder prepared in Comparative Example 1 was added to 90 parts by weight of distilled water and stirred at room temperature for 10 minutes. While stirring, the aqueous solution was added thereto to prepare a mixture.

The mixture was dried in an oven at 150° C. for 15 hours to prepare a dried product.

The dried product was put into a furnace and heat-treated in a stream of flowing oxygen at 720° C. for 5 hours to prepare a composite cathode active material.

The composite cathode active material had a structure in which a $LiCoO_2$ coating layer was disposed on a surface of the secondary particle and between the primary particles. The secondary particle included $Li_{1.05}Ni_{0.9}Co_{0.06}Mn_{0.03}O_2$. Also, an amount of cobalt in the $LiCoO_2$ coating layer was about 0.75 parts by weight based on 100 parts by weight of the composite cathode active material.

Comparative Example 3a: Preparation of Composite Cathode Active Material 0.75 parts by weight of $MgCl_2.H_2O$ was prepared, added to 10 parts by weight of distilled water, and stirred at room temperature for 1 minute to prepare an aqueous solution.

100 parts by weight of the $Li_{1.05}Ni_{0.91}Co_{0.06}Mn_{0.03}O_2$ powder prepared in Comparative Example 1 was added to 90 parts by weight of distilled water, and stirred at room temperature for 10 minutes. While stirring, the aqueous solution was added thereto to prepare a mixture.

The mixture was dried in an oven at 150° C. for 15 hours to prepare a dried product.

The dried product was put into a furnace and heat-treated in a stream of flowing oxygen at 720° C. for 5 hours to prepare a composite cathode active material.

The composite cathode active material had a structure in which a $LiMgO_{2+\delta}$ (wherein $-0.5 \leq \delta \leq 0$) coating layer was disposed on a surface of the secondary particle and between the primary particles. The secondary particle included $Li_{1.05}Ni_{0.91}Co_{0.06}Mn_{0.03}O_2$. Also, an amount of magnesium in the $LiMgO_{2+\delta}$ (wherein $-0.5 \leq \delta \leq 0$) coating layer was about 0.75 parts by weight based on 100 parts by weight of the composite cathode active material.

Comparative Example 4: Preparation of Composite Cathode Active Material

A composite cathode active material was prepared in the same manner as in Comparative Example 3, except that $Li_{1.09}Ni_{0.878}Co_{0.080}Mn_{0.04}Al_{0.002}O_2$ prepared in Comparative Example 2 was used instead of $Li_{1.05}Ni_{0.91}Co_{0.06}Mn_{0.03}O_2$ prepared in Comparative Example 1, and an amount of cobalt was changed to 0.5 parts by weight based on 100 parts by weight of the composite cathode active material.

In Examples 1 to 3 and 3a to 3c, the lithium transition metal oxide (Ni91) prepared in Comparative Example 1 was used.

Example 1: Preparation of Composite Cathode Active Material 0.75 parts by weight of a precursor mixture including $Co(NO_3)_2.6H_2O$ and $Al(NO_3)_3.9H_2O$ at a molar ratio of 3:1 was prepared, added to 10 parts by weight of distilled water, and stirred at room temperature (25° C.) for 1 minute to prepare an aqueous solution.

100 parts by weight of the $Li_{1.05}Ni_{0.91}Co_{0.06}Mn_{0.03}O_2$ powder prepared in Comparative Example 1 was added to 90 parts by weight of distilled water. While stirring at room temperature for 10 minutes, the aqueous solution was added thereto to obtain a precipitate. The precipitate thus obtained was filtered and dried at 150° C. for 15 hours to prepare a composite cathode active material precursor. The composite cathode active material precursor had a structure in which a cobalt aluminum hydroxide coating layer containing cobalt and aluminum at a molar ratio of 3:1 was disposed on $Li_{1.05}Ni_{0.91}Co_{0.06}Mn_{0.03}O_2$.

The composite cathode active material precursor was put into a furnace and heat-treated under an oxygen atmosphere at 720° C. for 5 hours to obtain a composite cathode active material. The composite cathode active material had a structure in which a $LiCo_{1.5}Al_{0.5}O_{4+\delta}$ (wherein $-0.5 \leq \delta \leq 0$) coating layer having a spinel crystal structure was disposed on a surface of the $Li_{1.05}Ni_{0.91}Co_{0.06}Mn_{0.03}O_2$ secondary particle and between the primary particles. The secondary particle included $Li_{1.05}Ni_{0.91}Co_{0.06}Mn_{0.03}O_2$. In the composite cathode active material, an amount of cobalt and aluminum in the $LiCo_{1.5}Al_{0.5}O_{4+\delta}$ (wherein $-0.5 \leq \delta \leq 0$) coating layer was about 0.75 parts by weight based on 100 parts by weight of the lithium transition metal oxide ($Li_{1.05}Ni_{0.91}Co_{0.06}Mn_{0.03}O_2$).

Example 2: Preparation of Composite Cathode Active Material

A composite cathode active material with a $LiCo_{1.33}Zn_{0.67}O_{4+\delta}$ (wherein $-0.5 \leq \delta \leq 0$) coating layer having a spinel crystal structure formed on a surface of the $Li_{0.05}Ni_{0.91}Co_{0.06}Mn_{0.03}O_2$ secondary particle and between the primary particles was prepared in the same manner as in Example 1, except that a precursor mixture including $Co(NO_3)_2.6H_2O$ and $Zn(NO_3)_2.6H_2O$ at a molar ratio of 2:1 was used instead of the precursor mixture including $Co(NO_3)_2.6H_2O$ and $Al(NO_3)_3.9H_2O$ at a molar ratio of 3:1 and the amount of precursor mixture including $Co(NO_3)_2.6H_2O$ and $Zn(NO_3)_2.6H_2O$ was controlled so that an amount of Co and Zn in the $LiCo_{1.33}Zn_{0.67}O_{4+\delta}$ (wherein $-0.835 \leq \delta \leq 0$) coating layer of the composite cathode active material was about 0.50 parts by weight based on 100 parts by weight of the lithium transition metal oxide.

Examples 2a to 2c: Preparation of Composite Cathode Active Materials

Composite cathode active materials were each prepared in the same manner as in Example 2, except that amounts of Co and Zn in the $LiCo_{1.33}Zn_{0.67}O_{4+\delta}$ (wherein $-0.835 \leq \delta \leq 0$) coating layer in the composite cathode active material were changed to 0.25 parts by weight, 0.75 parts by weight, and 1.5 parts by weight based on 100 parts by weight of the lithium transition metal oxide, respectively.

Example 3: Preparation of Composite Cathode Active Material

A composite cathode active material with a $LiCo_{1.2}Mg_{0.8}O_{4+\delta}$ (wherein $-0.9 \leq \delta \leq 0$) coating layer having a spinel crystal structure formed on a surface of the $Li_{1.05}Ni_{0.91}Co_{0.06}Mn_{0.03}O_2$ secondary particle and between the primary particles was prepared in the same manner as in Example 1, except that a precursor mixture including $Co(NO_3)_2 \cdot 6H_2O$ and $Mg(NO_3)_2 \cdot 6H_2O$ at a molar ratio of 3:2 was used as a precursor. In the composite cathode active material, an amount of Co and Mg in the $LiCo_{1.2}Mg_{0.8}O_{4+\delta}$ (wherein $-0.9 \leq \delta \leq 0$) coating layer was about 0.75 parts by weight based on 100 parts by weight of the lithium transition metal oxide.

Example 3a: Preparation of Composite Cathode Active Material

A composite cathode active material with a $LiCo_{1.6}Mg_{0.4}O_{4+\delta}$ (wherein $-0.7 \leq \delta \leq 0$) coating layer having a spinel crystal structure formed on a surface of the $Li_{0.05}Ni_{0.91}Co_{0.06}Mn_{0.03}O_2$ secondary particle and between the primary particles was prepared in the same manner as in Example 3, except that a precursor mixture including $Co(NO_3)_2 \cdot 6H_2O$ and $Mg(NO_3)_2 \cdot 6H_2O$ at a molar ratio of 4:1 was used as a precursor. In the composite cathode active material, an amount of Co and Mg in the $LiCo_{1.6}Mg_{0.4}O_{4+\delta}$ (wherein $-0.7 \leq \delta \leq 0$) coating layer was about 0.75 parts by weight based on 100 parts by weight of the lithium transition metal oxide.

Example 3b: Preparation of Composite Cathode Active Material

A composite cathode active material with a $LiCo_{0.8}Mg_{1.2}O_{4+\delta}$ (wherein $-1.1 \leq \delta \leq 0$) coating layer having a spinel crystal structure formed on a surface of the $Li_{0.05}Ni_{0.91}Co_{0.06}Mn_{0.03}O_2$ secondary particle and between the primary particles was prepared in the same manner as in Example 3, except that a precursor mixture including $Co(NO_3)_2 \cdot 6H_2O$ and $Mg(NO_3)_2 \cdot 6H_2O$ at a molar ratio of 2:3 was used as a precursor. An amount of Co and Mg in the $LiCo_{0.8}Mg_{1.2}O_4$ coating layer was about 0.75 parts by weight based on 100 parts by weight of the lithium transition metal oxide.

Example 3c: Preparation of Composite Cathode Active Material

A composite cathode active material with a $LiCo_{0.4}Mg_{1.6}O_{4+\delta}$ (wherein $-1.3 \leq \delta \leq 0$) coating layer having a spinel crystal structure formed on a surface of the $Li_{0.05}Ni_{0.91}Co_{0.06}Mn_{0.03}O_2$ secondary particle and between the primary particles was prepared in the same manner as in Example 3, except that a precursor mixture including $Co(NO_3)_2 \cdot 6H_2O$ and $Mg(NO_3)_2 \cdot 6H_2O$ at a molar ratio of 1:4 was used as a precursor. An amount of Co and Mg in the $LiCo_{0.4}Mg_{1.6}O_{4+\delta}$ (wherein $-1.3 \leq \delta \leq 0$) coating layer was about 0.75 parts by weight based on 100 parts by weight of the lithium transition metal oxide.

Example 4: Preparation of Composite Cathode Active Material

A composite cathode active material with a $LiCo_{1.33}Zn_{0.67}O_{4+\delta}$ (wherein $-0.835 \leq \delta \leq 0$) coating layer having a spinel crystal structure formed on a surface of the secondary particle and between the primary particles was prepared in the same manner as in Example 2, except that $Li_{1.09}Ni_{0.88}Co_{0.08}Mn_{0.04}O_2$ prepared in Comparative Example 2 was used instead of $Li_{1.05}Ni_{0.91}Co_{0.06}Mn_{0.03}O_2$ prepared in Comparative Example 1, and the amount of precursor mixture including $Co(NO_3)_2 \cdot 6H_2O$ and $Zn(NO_3)_2 \cdot 6H_2O$ was controlled so that an amount of Co and Zn in the $LiCo_{1.33}Zn_{0.67}O_{4+\delta}$ (wherein $-0.835 \leq \delta \leq 0$) coating layer of the composite cathode active material was about 0.25 parts by weight based on 100 parts by weight of the lithium transition metal oxide.

The secondary particle included $Li_{1.09}Ni_{0.88}Co_{0.08}Mn_{0.04}O_2$.

Example 4a: Preparation of Composite Cathode Active Material

A composite cathode active material with a $LiCo_{1.2}Mg_{0.8}O_{4+\delta}$ (wherein $-0.95650$) coating layer having a spinel crystal structure formed on a surface of the $Li_{1.09}Ni_{0.88}Co_{0.08}Mn_{0.04}O_2$ secondary particle and between the primary particles was prepared in the same manner as in Example 3, except that $Li_{1.09}Ni_{0.88}Co_{0.08}Mn_{0.04}O_2$ prepared in Comparative Example 2 was used instead of $Li_{1.05}Ni_{0.91}Co_{0.06}Mn_{0.03}O_2$ prepared in Comparative Example 1. In the composite cathode active material, an amount of Co and Mg in the $LiCo_{1.2}Mg_{0.8}O_{4+\delta}$ (wherein $-0.95650$) coating layer was about 0.75 parts by weight based on 100 parts by weight of the lithium transition metal oxide.

Example 5: Preparation of Composite Cathode Active Material

A composite cathode active material was prepared in the same manner as in Example 4, except that an amount of Co and Zn of the $LiCo_{1.33}Zn_{0.67}O_{4+\delta}$ (wherein $-0.835 \leq \delta \leq 0$) coating layer in the composite cathode active material was changed to 0.50 parts by weight based on 100 parts by weight of the lithium transition metal oxide.

Example 5a: Preparation of Composite Cathode Active Material

A composite cathode active material with a $LiCo_{1.5}Al_{0.5}O_{4+\delta}$ (wherein $-0.5 \leq \delta \leq 0$) coating layer having a spinel crystal structure formed on a surface of the secondary particle and between the primary particles was prepared in the same manner as in Example 1, except that $Li_{1.09}Ni_{0.88}Co_{0.08}Mn_{0.04}O_2$ prepared in Comparative Example 2 was used instead of $Li_{1.05}Ni_{0.91}Co_{0.06}Mn_{0.03}O_2$ prepared in Comparative Example 1. The secondary particle included $Li_{1.09}Ni_{0.88}Co_{0.08}Mn_{0.04}O_2$.

In the composite cathode active material, an amount of Co and Al in the $LiCo_{1.5}Al_{0.5}O_{4+\delta}$ (wherein $-0.5 \leq \delta \leq 0$) coating layer was about 0.75 parts by weight based on 100 parts by weight of the lithium transition metal oxide.

Example 6: Preparation of Coin Half Cell

The composite cathode active material prepared in Example 1, a carbon conducting material (Denka Black), and polyvinylidene fluoride (PVDF) were mixed at a weight ratio of 92:4:4 to prepare a mixture, and then the mixture was mixed with N-methylpyrrolidone (NMP) in an agate mortar to prepare a slurry. The slurry was bar coated on an aluminum current collector having a thickness of 15 μm, dried at room temperature, dried once more in vacuum at 120° C., and then roll-pressed and punched to prepare a cathode having a thickness of 55 μm.

The cathode thus prepared, a lithium metal as a counter electrode, a PTFE separator, and a solution prepared by dissolving 1.15 moles per liter (M) of LiPF$_6$ in ethylene carbonate (EC), ethylmethyl carbonate (EMC), and dimethyl carbonate (DMC) at a volume ratio of 2:4:4 as an electrolyte were used to prepare a coin half cell.

Examples 7 to 10: Preparation of Coin Half Cells

Coin half cells were prepared in the same manner as in Example 6, except that the composite cathode active materials prepared in Examples 2 to 5 were used instead of the composite cathode active material prepared in Example 1.

Examples 11 to 13: Preparation of Coin Half Cells

Coin half cells were prepared in the same manner as in Example 6, except that the composite cathode active materials prepared in Examples 2a to 2c were used instead of the composite cathode active material prepared in Example 1.

Examples 14 to 16: Preparation of Coin Half Cells

Coin half cells were prepared in the same manner as in Example 6, except that the composite cathode active materials prepared in Examples 3a to 3c were used instead of the composite cathode active material prepared in Example 1.

Example 17: Preparation of Coin Half Cell

A coin half cell was prepared in the same manner as in Example 6, except that the composite cathode active material prepared in Example 4a was used instead of the composite cathode active material prepared in Example 1.

Comparative Examples 5 to 8: Preparation of Coin Half Cells

Coin half cells were prepared in the same manner as in Example 6, except that the cathode active materials prepared in Comparative Examples 1 to 4 were used instead of the composite cathode active material prepared in Example 1.

Comparative Example 8a: Preparation of Coin Half Cell

A coin half cell was prepared in the same manner as in Example 6, except that the composite cathode active material prepared in Comparative Example 3a was used instead of the composite cathode active material prepared in Example 1.

Comparative Example 9: Preparation of Composite Cathode Active Material

A composite cathode active material was prepared in the same manner as in Example 1, except that the composite cathode active material precursor was put into a furnace and heat-treated under an oxygen atmosphere at 400° C. for 5 hours.

Comparative Example 10: Preparation of Composite Cathode Active Material

A composite cathode active material was prepared in the same manner as in Example 1, except that the composite cathode active material precursor was put into a furnace and heat-treated under an oxygen atmosphere at 1050° C. for 5 hours.

Comparative Examples 11 and 12: Preparation of Coin Half Cells

Coin half cells were prepared in the same manner as in Example 6, except that the composite cathode active materials prepared in Comparative Examples 9 and 10 were used instead of the composite cathode active material prepared in Example 1.

Example 18: Preparation of Coin Half Cell

A coin half cell was prepared in the same manner as in Example 6, except that the composite cathode active material prepared in Example 5a was used instead of the composite cathode active material prepared in Example 1.

Example 19: Preparation of 18650 Minicell

The composite cathode active material prepared in Example 2, a carbon conducting material (Denka Black), and polyvinylidene fluoride (PVDF) were mixed at a weight ratio of 92:4:4 to prepare a mixture, and then the mixture was mixed with N-methylpyrrolidone (NMP) in an agate mortar to prepare a slurry. The slurry was bar coated on an aluminum current collector having a thickness of 15 μm, dried at room temperature, dried once more in vacuum at 120° C., and then roll-pressed and punched to prepare a cathode having a thickness of 55 μm.

The cathode was wound together with a graphite anode in a cylinder. A cathode tab and an anode tab were welded to the cylinder and then inserted and sealed in a cylindrical can. Thereafter, an electrolyte was injected into the cylindrical can and the can was cap-clapped to prepare a 18650 minicell. Here, a separator was prepared by coating both surfaces of a polyethylene substrate (commercially available from Asahi) with an α-Al$_2$O$_3$ powder having an average particle diameter of 50 nm.

The electrolyte was a solution prepared by dissolving 1.15 moles per liter (M) of LiPF$_6$ in ethylene carbonate (EC), ethylmethyl carbonate (EMC), and dimethyl carbonate (DMC) at a volume ratio of 2:4:4 as an electrolyte.

Examples 20 and 21: Preparation of 18650 Minicells

Lithium batteries (18650 minicells) were prepared in the same manner as is Example 19, except that the composite cathode active materials prepared in Examples 4 and 4a were used instead of the composite cathode active material prepared in Example 2.

Comparative Example 13: Preparation of 18650 Minicell

The lithium transition metal oxide (Li$_{1.05}$Ni$_{0.91}$Co$_{0.06}$Mn$_{0.03}$O$_2$) prepared in Comparative Example 1 and distilled water were mixed at a weight ratio of 1:2 and then stirred at a rate of about 250 revolutions per minute (rpm) and washed with water. Thereafter, the resultant oxide was dried at 150° C. for 15 hours to prepare a washed lithium transition metal oxide (Li$_{1.05}$Ni$_{0.91}$Co$_{0.06}$Mn$_{0.03}$O$_2$).

A lithium battery (a 18650 minicell) was prepared the same as in Example 19, except that the washed lithium transition metal oxide ($Li_{1.05}Ni_{0.91}Co_{0.06}Mn_{0.03}O_2$) obtained as described above was used instead of the composite cathode active material prepared in Example 2.

Comparative Example 13a: Preparation of Coin Half Cell

The lithium transition metal oxide ($Li_{1.05}Ni_{0.91}Co_{0.06}Mn_{0.03}O_2$) prepared in Comparative Example 1 and distilled water were mixed at a weight ratio of 1:2 and then stirred at a rate of about 250 revolutions per minute (rpm) and washed with water. Thereafter, the resultant oxide was dried at 150° C. for 15 hours to prepare a washed lithium transition metal oxide ($Li_{1.05}Ni_{0.91}Co_{0.06}Mn_{0.03}O_2$).

Coin half cell was prepared in the same manner as in Example 6, except that the washed lithium transition metal oxide ($Li_{1.05}Ni_{0.91}Co_{0.06}Mn_{0.03}O_2$) as described above was used instead of the composite cathode active material prepared in Example 1.

Comparative Example 14: Preparation of 18650 Minicell

A lithium battery (a 18650 minicell) was prepared in the same manner as in Example 19, except that the lithium transition metal oxide ($Li_{1.09}Ni_{0.88}Co_{0.08}Mn_{0.04}O_2$) prepared in Comparative Example 2 instead of the composite cathode active material prepared in Example 2.

Comparative Example 15: Preparation of Coin Half Cell

The lithium transition metal oxide ($Li_{1.09}Ni_{0.88}Co_{0.08}Mn_{0.04}O_2$) prepared in Comparative Example 2 and distilled water were mixed at a weight ratio of 1:2 and then stirred at a rate of about 250 rpm and washed with water. Thereafter, the resultant oxide was dried at 150° C. for 15 hours to prepare a washed lithium transition metal oxide ($Li_{1.09}Ni_{0.88}Co_{0.08}Mn_{0.04}O_2$).

A lithium battery (a coin half cell) was prepared the same as in Example 6, except that the washed lithium transition metal oxide ($Li_{1.09}Ni_{0.88}Co_{0.08}Mn_{0.04}O_2$) obtained as described above was used instead of the composite cathode active material prepared in Example 2.

Evaluation Example 1: SEM Image Analysis

1) Example 4a and Comparative Examples 2 and 4

Figure 2A:
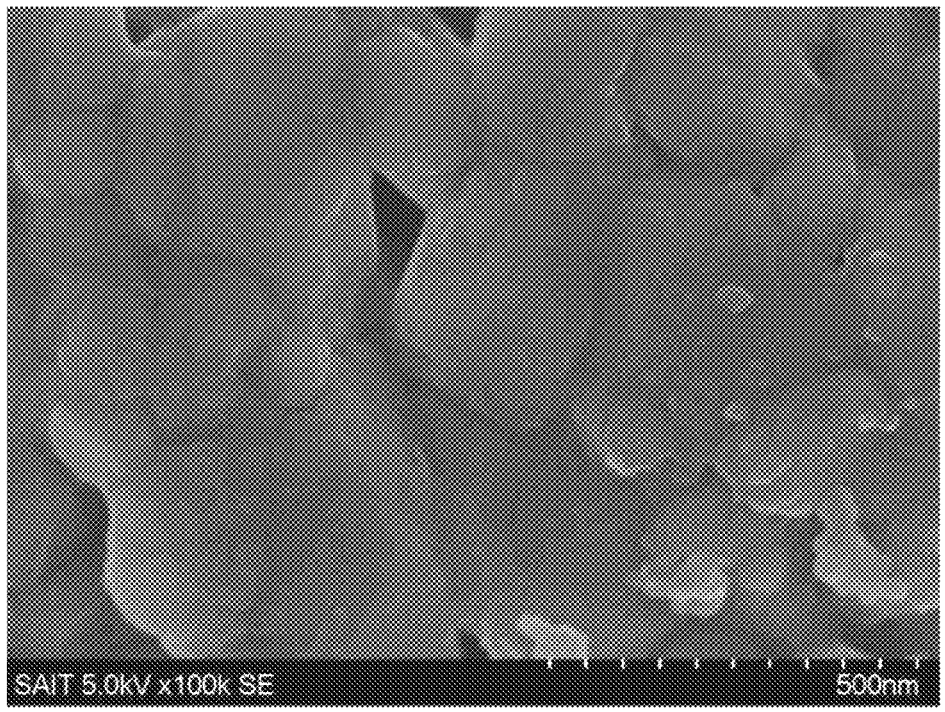
FIGS. 2A to 2C are SEM images of composite cathode active material powders prepared in Example 4A and Comparative Examples 2 and 4.
Figure 2B:
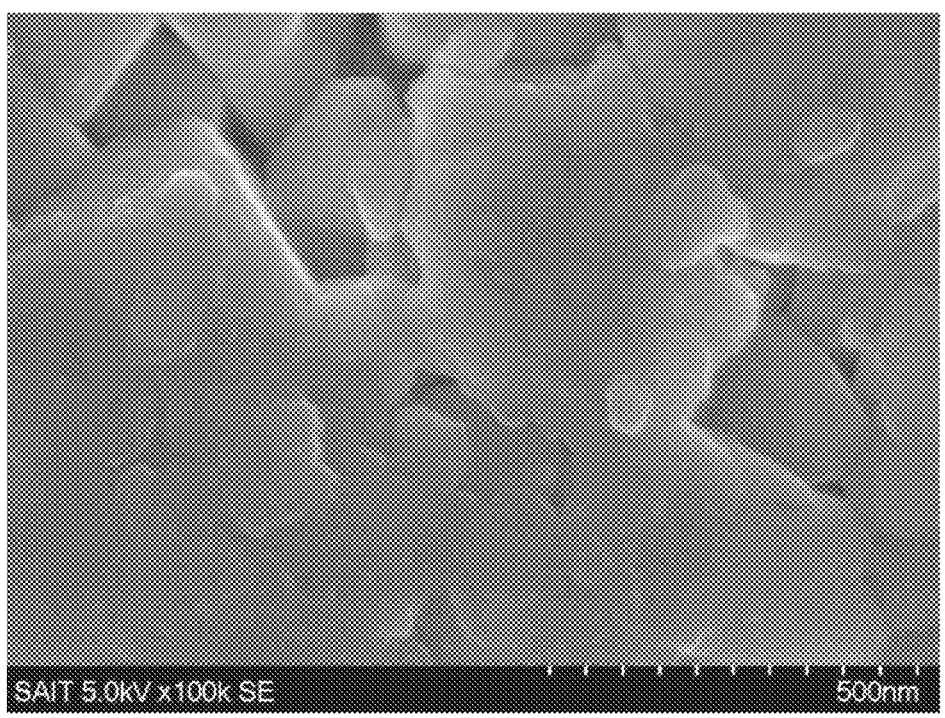
Figure 2C:
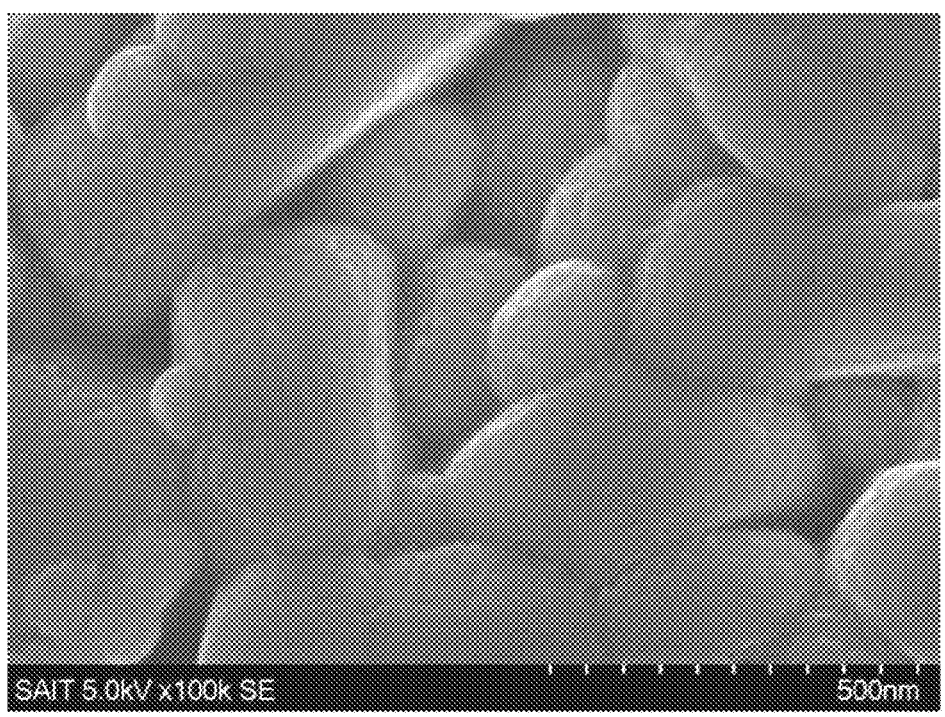

Surfaces of the cathode active material powders prepared in Example 4a and Comparative Examples 2 and 4 were analyzed using a scanning electron microscope, and the results are shown in FIGS. 2A to 2C.

Referring to FIGS. 2A to 2C, a size of primary particles in the composite cathode active material of Example 4a increased compared to those of the composite cathode active materials prepared in Comparative Examples 2 and 4. Also, a thickness of a layered double oxide (LDO) coating layer in the composite cathode active material of Example 4a was about 100 nm.

2) Example 1

Figure 1B:
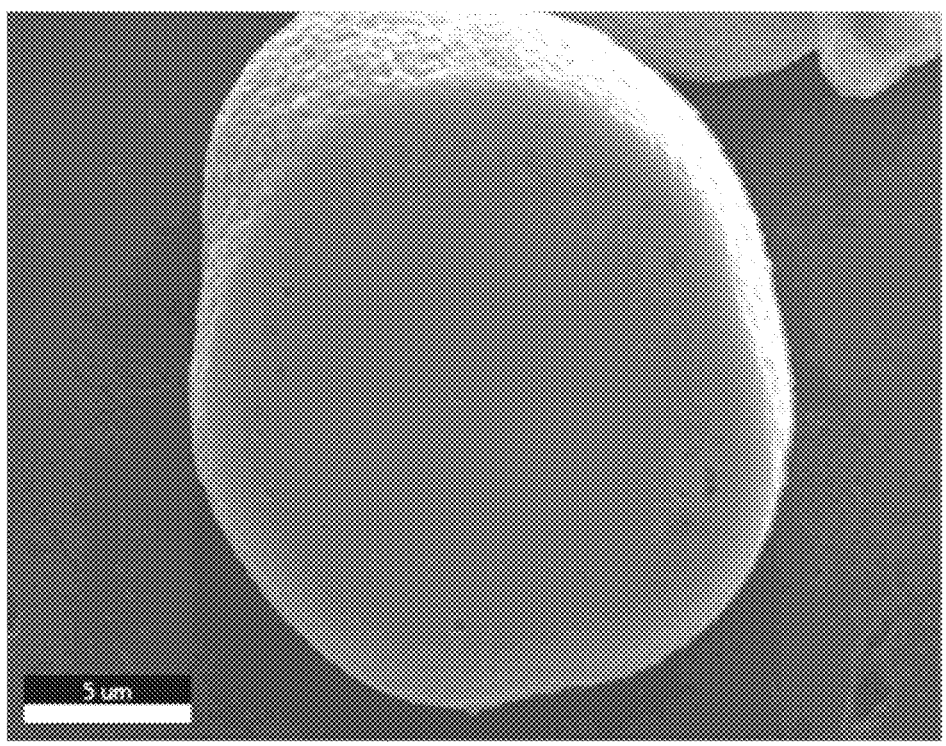
FIG. 1B is a scanning electron microscope (SEM) image of a composite cathode active material prepared in Example 1.

Scanning electron microscope analysis was performed on the composite cathode active material prepared in Example 1, and the results are shown in FIG. 1B.

Referring to FIG. 1B, an average particle diameter of the composite cathode active material having a coating layer on a secondary particle and between primary particles of lithium transition metal oxide was about 10 μm.

Evaluation Example 2: X-Ray Diffraction Analysis

X-ray diffraction (XRD) analysis was performed on the composite cathode active material of Example 3. The results of the XRD analysis are shown in FIG. 3.

Figure 3:
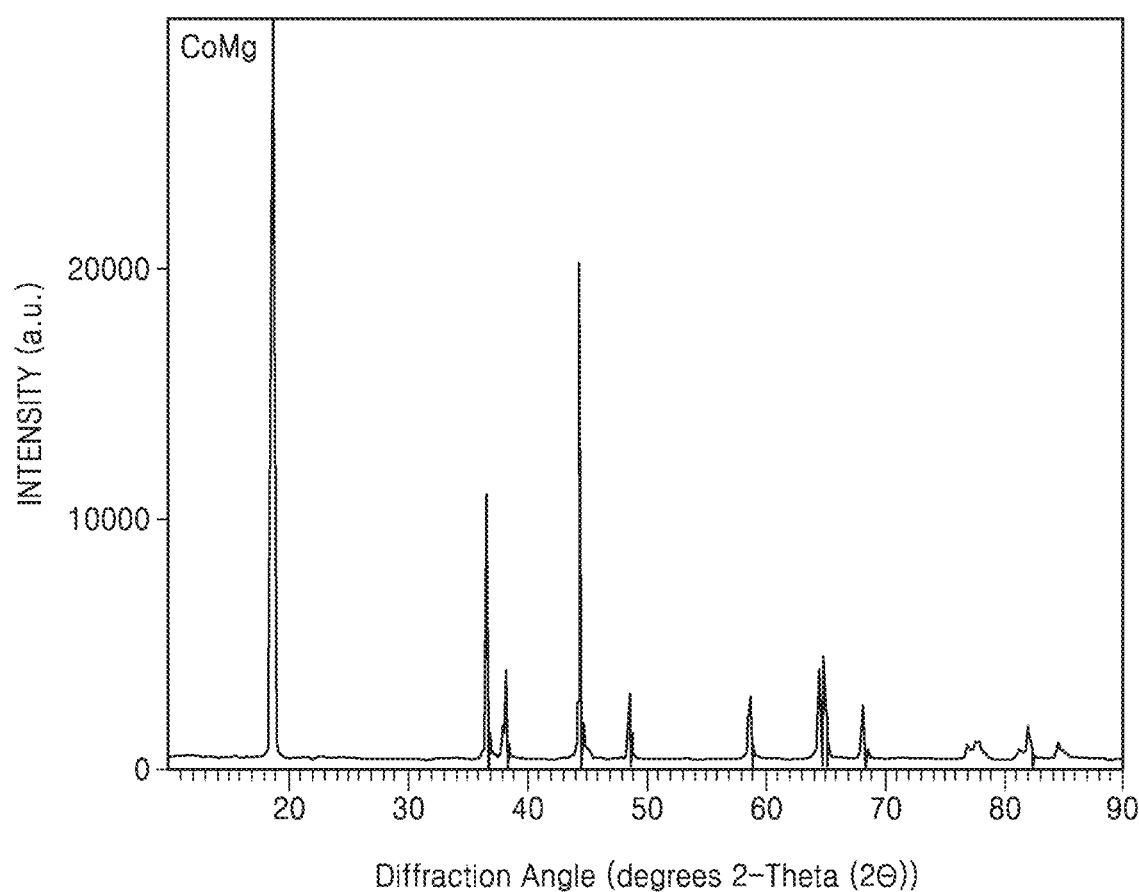
FIG. 3 is a graph of diffraction angle (degrees two-theta, 2θ) and is an X-ray diffraction (XRD) pattern of composite cathode active material prepared in Example 1.

Referring to FIG. 3, a layered crystal structure of a lithium transition metal oxide and a spinel crystal structure of a lithium cobalt composite oxide were observed from the XRD spectrum of the composite cathode active material of Example 1. It was confirmed that the composite cathode active material of Example 1 included a lithium transition metal oxide having a layered crystal structure and a coating layer including a lithium cobalt composite oxide having a spinel crystal structure.

Evaluation Example 3: High-Angle Annular Dark-Field (HAADF) Scanning Transmission Electron Microscopy (STEM) and Energy-Dispersive X-Ray Spectroscopy (EDS)

A composition of the composite cathode active material prepared in Example 3 was analyzed by performing high-angle annular dark-field (HAADF) scanning transmission electron microscopy (STEM) and energy-dispersive X-ray spectroscopy (EDS) analyses.

It was confirmed that Ni, Mn, and Co were uniformly distributed in the whole composite cathode active material. Also, it was confirmed that Co and Mg were located between the primary particles, and Co and Mg were located on surfaces of the primary particles and on the secondary particles. Therefore, it was confirmed that $LiCo_{1.2}Mg_{0.8}O_4$ was uniformly coated on both grain boundaries between the primary particles and on surfaces of the primary particles and on a surface of the secondary particle.

Evaluation Example 4: Residual Lithium Amount Evaluation

1) Examples 1 to 3, 2a, and 3a to 3c and Comparative Example 1

Surface residual lithium amounts of the cathode active materials prepared in Examples 1 to 3, 2a, and 3a to 3c and Comparative Example 1 were measured and the results are shown in Table 1.

The surface residual lithium amounts were evaluated by measuring Li amounts in $Li_2CO_3$ and LiOH remaining on surfaces of the cathode active material using a wet method (or a titration method).

TABLE 1

|  | Residual lithium amount (ppm) |
| --- | --- |
| Example 1 | 374 |
| Example 2 | 584 |
| Example 2a | 636 |
| Example 3 | 394 |
| Example 3a | 494 |

TABLE 1-continued

| | Residual lithium amount (ppm) |
|---|---|
| Example 3b | 384 |
| Example 3c | 491 |
| Comparative Example 1 | 2807 |

Referring to Table 1, surface residual lithium amounts of the composite cathode active materials of Examples 1 to 3, 2a, and 3a to 3c decreased compared to that of the cathode active material of Comparative Example 1. Therefore, lithium batteries including the composite cathode active materials of Examples 1 to 3, 2a, and 3a to 3c may suppress gas occurrence during charging/discharging of the lithium batteries and may suppress deterioration of lifetime characteristics.

2) Examples 4, 5, and 5a and Comparative Examples 2 and 4

Surface residual lithium amounts of the cathode active materials prepared in Examples 4, 5, and 5a and Comparative Examples 2 and 4 were measured and a part of the results are shown in Table 2.

The surface residual lithium amounts were evaluated by measuring Li amounts in $Li_2CO_3$ and LiOH remaining on surfaces of the cathode active material using a wet method (or a titration method).

TABLE 2

| | Residual lithium amount (ppm) |
|---|---|
| Example 4 | 545 |
| Example 5 | 515 |
| Example 5a | 732 |
| Comparative Example 2 | 5489 |
| Comparative Example 4 | 2109 |

Referring to Table 2, surface residual lithium amounts of the composite cathode active materials of Examples 4, 5, and 5a decreased compared to those composite cathode active materials of Comparative Examples 2 and 4.

Evaluation Example 5: Thermal Stability Test

Differential scanning calorimetry analysis was performed on the composite cathode active materials of Examples 2 and 3 and Comparative Example 3. The results of the analysis are shown in Table 3.

TABLE 3

| | Caloric value (J/g) |
|---|---|
| Example 2 | 1702 |
| Example 3 | 1487 |
| Comparative Example 3 | 1805 |

Referring to Table 3, calorific values of the composite cathode active materials of Examples 2 and 3 decreased compared to that of the cathode active material of Comparative Example 3. In this regard, thermal stabilities of the composite cathode active materials of Examples 2 and 3 improved.

Evaluation Example 6: Charging/Discharging Characteristics

At 25° C., the lithium batteries prepared in Examples 6 to 8 and Comparative Examples 5 and 7 were charged with a constant current (CC) rate of 0.1 relative current (C) until a voltage was 4.35 V (vs. Li) and then discharged with a constant current (CC) rate of 0.1 C until a voltage of the discharge was 2.8 V (vs. Li) ($1^{st}$ formation cycle).

At 25° C., the lithium batteries underwent the $1^{st}$ cycle were charged with a constant current rate of 0.33 C until a voltage was 4.35V (vs. Li), and the current was cut-off at a rate of 0.05 C while the voltage was maintained at 4.35 V in a constant voltage (CV) mode. Then, the batteries were discharged with a constant current rate of 0.2 C until a voltage of the discharge was 2.8 V (vs. Li) ($2^{nd}$ cycle).

At 25° C., the lithium batteries underwent the $2^{nd}$ cycle were charged with a constant current rate of 1 C until a voltage was 4.35V (vs. Li), and then were discharged with a constant current rate of 1 C until a voltage of the discharge was 2.8 V (vs. Li) ($3^{rd}$ cycle).

The lithium batteries that underwent the $3^{rd}$ cycle were charged and discharged up to the $53^{nd}$ cycle under the same conditions.

In the whole charging/discharging cycle, 20 minutes of retention time was set after every charging/discharging cycle.

A part of the charging/discharging test results are shown in Table 4. A capacity retention at the $53^{nd}$ cycle and an initial charging/discharging efficiency at the $1^{st}$ cycle are defined as shown in Equations 1 and 2.

Capacity retention [%]=[Discharge capacity at $53^{nd}$ cycle/discharge capacity at $3^{rd}$ cycle]×100%   Equation 1

Initial efficiency [%]=[Discharge capacity at $1^{st}$ cycle/charge capacity at $1^{st}$ cycle]×100%   Equation 2

TABLE 4

| | $1^{st}$ cycle charge capacity (mAh/g) | Initial efficiency (%) | $2^{nd}$ cycle discharge capacity (mAh/g) | Capacity retention (%) |
|---|---|---|---|---|
| Example 6 | 246 | 90 | 216 | 85 |
| Example 7 | 246 | 90 | 213 | 84.8 |
| Example 8 | 246 | 90 | 215.2 | 87.6 |
| Comparative Example 5 | 246 | 92 | 221 | 65.7 |
| Comparative Example 7 | 246 | 90 | 213 | 84 |

As shown in Table 4, capacity retention of the lithium batteries of Examples 6 to 8 significantly improved compared to that of the lithium battery of Comparative Example 5. Although an initial efficiency of the lithium battery of Comparative Example 5 was excellent, the capacity retention of the lithium battery of Comparative Example 5 was worse than those of the lithium batteries of Examples 6 to 8.

In addition, although initial efficiencies of the lithium batteries of Examples 6 to 8 were the same as the lithium battery of Comparative Example 7, the capacity retention of the lithium batteries of Examples 6 to 8 improved.

Charging/discharging characteristics (initial efficiencies and capacity retention) of the lithium batteries prepared in Comparative Examples 11 and 12 were also measured in the same evaluation method used in the lithium battery of Example 6.

It was confirmed that an initial efficiency and a capacity retention of the lithium battery of Example 6 improved compared to the lithium batteries of Comparative Examples 11 and 12.

Evaluation Example 7: Charging/Discharging Characteristics

At 25° C., the lithium batteries prepared in Examples 11 to 13 and Comparative Example 13a were charged with a constant current (CC) rate of 0.1 C until a voltage was 4.35 V (vs. Li) and then discharged with a constant current (CC) rate of 0.1 C until a voltage of the discharge was 2.8 V (vs. Li) ($1^{st}$ formation cycle).

At 25° C., the lithium batteries underwent the $1^{st}$ cycle were charged with a constant current rate of 0.33 C until a voltage was 4.35V (vs. Li), and the current was cut-off at a rate of 0.05 C while the voltage was maintained at 4.35 V in a CV mode. Then, the batteries were discharged with a constant current rate of 0.2 C until a voltage of the discharge was 2.8 V (vs. Li) ($2^{nd}$ cycle).

At 25° C., the lithium batteries underwent the $2^{nd}$ cycle were charged with a constant current rate of 1 C until a voltage was 4.35V (vs. Li), and then were discharged with a constant current rate of 1 C until a voltage of the discharge was 2.8 V (vs. Li) ($3^{rd}$ cycle).

The lithium batteries underwent the $3^{rd}$ cycle were charged and discharged up to the $53^{nd}$ cycle under the same conditions.

In the whole charging/discharging cycle, 20 minutes of retention time was set after every charging/discharging cycle.

A part of the charging/discharging test results are shown in Table 5.

TABLE 5

| | $1^{st}$ cycle charge capacity (mAh/g) | Initial efficiency (%) | $2^{nd}$ cycle discharge capacity (mAh/g) | Capacity retention (%) |
|---|---|---|---|---|
| Example 11 | 247 | 90 | 220 | 90.6 |
| Example 12 | 243 | 90 | 216 | 90.0 |
| Example 13 | 241 | 90 | 212 | 90.0 |
| Comparative Example 13a | 247 | 88 | 216 | 89.5 |

As shown in Table 5, initial efficiencies and capacity retention of the lithium batteries of Examples 11 to 13 improved compared to those of the lithium battery of Comparative Example 13a.

Evaluation Example 8: Charging/Discharging Characteristics

At 25° C., the lithium batteries prepared in Examples 8 and 14 to 16 and Comparative Examples 5, 7, and 8a were charged with a constant current (CC) rate of 0.1 C until a voltage was 4.35 V (vs. Li) and then discharged with a constant current (CC) rate of 0.1 C until a voltage of the discharge was 2.8 V (vs. Li) ($1^{st}$ formation cycle).

At 25° C., the lithium batteries that underwent the $1^{st}$ cycle were charged with a constant current rate of 0.33 C until a voltage was 4.35V (vs. Li), and the current was cut-off at a rate of 0.05 C while the voltage was maintained at 4.35 V in a CV mode. Then, the batteries were discharged with a constant current rate of 0.2 C until a voltage of the discharge was 2.8 V (vs. Li) ($2^{nd}$ cycle).

At 25° C., the lithium batteries that underwent the $2^{nd}$ cycle were charged with a constant current rate of 1 C until a voltage was 4.35 V (vs. Li), and then were discharged with a constant current rate of 1 C until a voltage of the discharge was 2.8 V (vs. Li) ($3^{rd}$ cycle).

The lithium batteries that underwent the $3^{rd}$ cycle were charged and discharged up to the $53^{nd}$ cycle under the same conditions.

In the whole charging/discharging cycle, 20 minutes of retention time was set after every charging/discharging cycle.

A part of the charging/discharging test results is shown in Table 6. The high-rate characteristics were also investigated by the methods described below.

At 25° C., the lithium batteries prepared in Examples 8 and 14 to 16 and Comparative Examples 5, 7, and 8a were charged with a constant current (CC) rate of 0.1 C until a voltage was 4.35 V (vs. Li) and then discharged with a constant current (CC) rate of 0.1 C until a voltage of the discharge was 2.8 V (vs. Li) ($1^{st}$ formation cycle).

At 25° C., the lithium batteries that underwent the $1^{st}$ cycle were charged with a constant current rate of 0.33 C until a voltage was 4.35 V (vs. Li), and the current was cut-off at a rate of 0.05 C while the voltage was maintained at 4.35 V in a CV mode. Then, the batteries were discharged with a constant current rate of 0.2 C until a voltage of the discharge was 2.8 V (vs. Li) ($2^{nd}$ cycle).

At 25° C., the lithium batteries that underwent the $2^{nd}$ cycle were charged with a constant current rate of 0.5 C until a voltage was 4.35 V (vs. Li), and then the current was cut-off at a rate of 0.05 C while the voltage was maintained at 4.35 V in a CV mode. Then, the batteries were discharged with a constant current rate of 0.33 C until a voltage of the discharge was 2.8 V (vs. Li) ($3^{rd}$ cycle). At 25° C., the lithium batteries that underwent the $3^{rd}$ cycle were charged with a constant current rate of 0.5 C until a voltage was 4.35V (vs. Li), and then the current was cut-off at a rate of 0.05 C while the voltage was maintained at 4.35 V in a CV mode. Then, the batteries were discharged with a constant current rate of 1 C until a voltage of the discharge was 2.8 V (vs. Li) ($4^{th}$ cycle).

At 25° C., the lithium batteries that underwent the $4^{th}$ cycle were charged with a constant current rate of 0.5 C until a voltage was 4.35V (vs. Li), and then the current was cut-off at a rate of 0.05 C while the voltage was maintained at 4.35 V in a CV mode. Then, the batteries were discharged with a constant current rate of 2 C until a voltage of the discharge was 2.8 V (vs. Li) ($5^{th}$ cycle).

At 25° C., the lithium batteries that underwent the $5^{th}$ cycle were charged with a constant current rate of 0.5 C until a voltage was 4.35V (vs. Li), and then the current was cut-off at a rate of 0.05 C while the voltage was maintained at 4.35 V in a CV mode. Then, the batteries were discharged with a constant current rate of 3 C until a voltage of the discharge was 2.8 V (vs. Li) ($6^{th}$ cycle).

A high rate characteristic is defined as shown in Equation 3, and the result of the high rate characteristic is shown in Table 6.

$$\text{High rate characteristic [\%]} = [\text{Discharge capacity at } 6^{th} \text{ cycle (3 C rate)}/\text{discharge capacity at } 3^{rd} \text{ cycle (0.33 C rate)}] \times 100\% \quad \text{Equation 3}$$

TABLE 6

| | 1st cycle charge capacity (mAh/g) | Initial efficiency (%) | High rate characteristic (%) | 2nd cycle discharge capacity (mAh/g) | Capacity retention (%) |
|---|---|---|---|---|---|
| Example 8 | 246 | 90 | 92 | 216 | 86.6 |
| Example 14 | 246 | 90 | 93 | 215 | 87.6 |
| Example 15 | 245 | 89 | 93 | 213 | 87.6 |
| Example 16 | 245 | 89 | 92 | 213 | 87.3 |
| Comparative Example 8a | 241 | 87 | — | — | — |
| Comparative Example 5 | 246 | 92 | 87 | 221 | 65.7 |
| Comparative Example 7 | 246 | 90 | 92 | 214 | 85.2 |

As shown in Table 6, capacity retention and high rate characteristics of the lithium batteries of Examples 8 and 14 to 16 improved compared to those of the lithium battery of Comparative Example 5. Although the high rate characteristics of the lithium batteries of Example 8 and 16 performed as well as the lithium battery of Comparative Example 7, the capacity retention of the lithium batteries of Example 8 and 16 improved compared to that of the lithium battery of Comparative Example 7. Also, initial efficiencies of the lithium batteries of Examples 8 and 14 to 16 improved compared that that of the lithium battery of Comparative Example 8a.

Evaluation Example 9: Charging/Discharging Characteristics

At 25° C., the lithium batteries prepared in Examples 9, 10, 17, and 18 and Comparative Examples 8 and 15 were charged with a constant current (CC) rate of 0.1 C until a voltage was 4.35 V (vs. Li) and then discharged with a constant current (CC) rate of 0.1 C until a voltage of the discharge was 2.8 V (vs. Li) (1st formation cycle).

At 25° C., the lithium batteries that underwent the 1st cycle were charged with a constant current rate of 0.33 C until a voltage was 4.35V (vs. Li), and the current was cut-off at a rate of 0.05 C while the voltage was maintained at 4.35 V in a CV mode. Then, the batteries were discharged with a constant current rate of 0.2 C until a voltage of the discharge was 2.8 V (vs. Li) (2nd cycle).

At 25° C., the lithium batteries that underwent the 2nd cycle were charged with a constant current rate of 1 C until a voltage was 4.35V (vs. Li), and discharged with a constant current rate of 1 C until a voltage of the discharge was 2.8 V (vs. Li) (3rd cycle).

The lithium batteries that underwent the 3rd cycle were charged/discharged repeatedly up to the 53rd cycle under the same conditions.

In the whole charging/discharging cycle, 20 minutes of retention time was set after every charging/discharging cycle.

A part of the results of the charging/discharging test is shown in Table 7.

TABLE 7

| | 1st cycle charge capacity (mAh/g) | Initial efficiency (%) | 2nd cycle discharge capacity (mAh/g) | Capacity retention (%) |
|---|---|---|---|---|
| Example 9 | 246 | 91 | 217 | 92 |
| Example 10 | 246 | 90 | 214 | 92 |
| Example 17 | 238 | 93 | 218 | 95.2 |
| Example 18 | 241 | 90 | 213 | 91.3 |
| Comparative Example 8 | 242 | 91 | 216 | 90 |
| Comparative Example 15 | 243 | 89 | 216 | 90 |

As shown in Table 7, capacity retention of the lithium batteries of Examples 9, 10, and 17 significantly improved compared to those of the lithium batteries of Comparative Examples 8 and 15. Also, although an initial efficiency of the lithium battery of Example 9 was comparable to that of the lithium battery of Comparative Example 8, the capacity retention of the lithium battery of Example 9 improved.

Also, as shown in Table 7, the lithium battery of Example 18 had an improved capacity retention compared to that of the lithium battery of Comparative Example 8, and the initial efficiency and the capacity retention of the lithium battery of Comparative Example 18 both improved compared to those of the lithium battery of Comparative Example 15.

Evaluation Example 10: High-Temperature (45° C.) Charging/Discharging Characteristics 1) Example 19 and Comparative Example 13

At 45° C., the lithium batteries (18650 minicells) were each charged with a constant current (CC) rate of 0.1 C until a voltage was 4.35 V (vs. Li) and then discharged with a constant current (CC) rate of 0.1 C until a voltage of the discharge was 2.8 V (vs. Li) (1st formation cycle).

At 45° C., the lithium batteries that underwent the 1st cycle were charged with a constant current rate of 0.33 C until a voltage was 4.35V (vs. Li), and the current was cut-off at a rate of 0.05 C while the voltage was maintained at 4.35 V in a CV mode. Then, the batteries were discharged with a constant current rate of 0.2 C until a voltage of the discharge was 2.8 V (vs. Li) (2nd cycle).

At 45° C., the lithium batteries that underwent the 2nd cycle were charged with a constant current rate of 1 C until a voltage was 4.35V (vs. Li), and discharged with a constant current rate of 1 C until a voltage of the discharge was 2.8 V (vs. Li) (3rd cycle).

At 45° C., the lithium batteries that underwent the 3rd cycle were charged/discharged repeatedly up to the 302nd cycle under the same conditions.

In the whole charging/discharging cycle, 20 minutes of retention time was set after every charging/discharging cycle.

Figure 5:
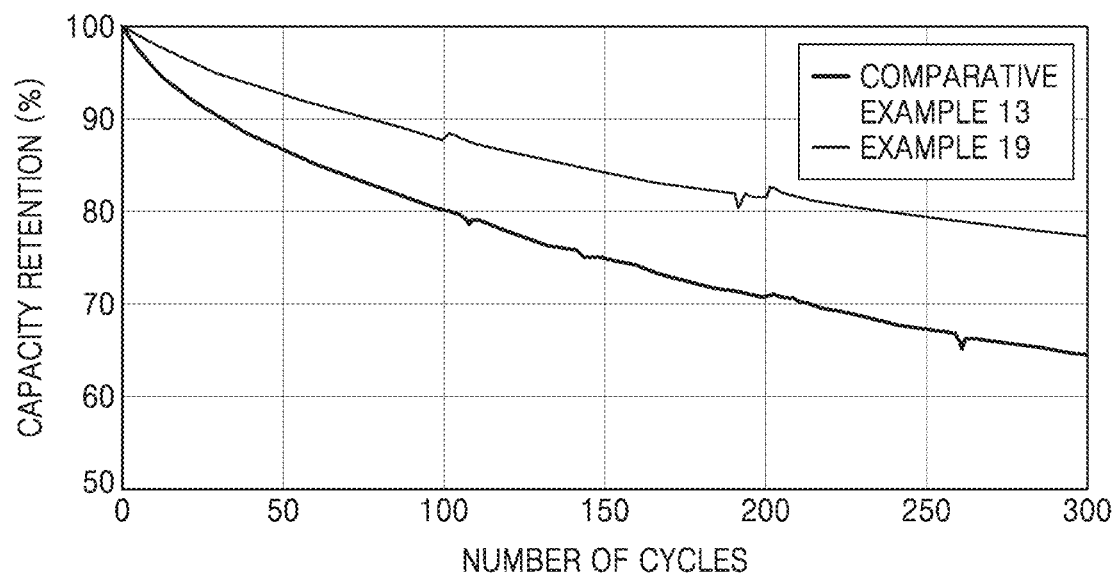
FIG. 5 is a graph of capacity retention (percent, %) versus number of cycles and shows high-temperature lifetime characteristics of lithium batteries (18650 minicells) prepared in Example 19 and Comparative Example 13.

Capacity retention according to the number of cycles were evaluated and the results are shown in FIG. 5.

Referring to FIG. 5, it was confirmed that a capacity retention of the lithium battery of Example 19 improved compared to that of the lithium battery of Comparative Example 13.

Charging/discharging characteristics of the lithium batteries of Examples 20 and 21 and Comparative Examples 14 and 15 were evaluated in the same manner as used in evaluating charging/discharging characteristics of the lithium batteries of Example 19 and Comparative Example 13. The results of the evaluation are shown in FIG. 6.

Figure 6:
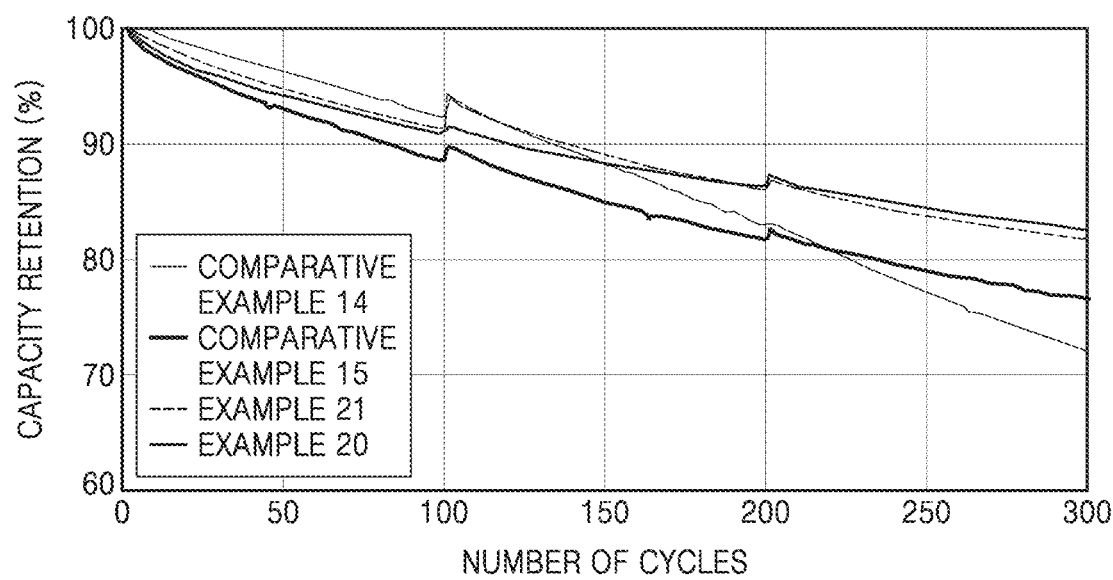
FIG. 6 is a graph of capacity retention (percent, %) versus number of cycles and shows high-temperature lifetime characteristics of lithium batteries (18650 minicells) prepared in Examples 20 and 21 and Comparative Examples 14 and 15.

Referring to FIG. 6, capacity retention characteristics of the lithium batteries of Examples 20 and 21 improved compared to those of the lithium batteries of Comparative Examples 14 and 15 at 45° C.

As described above, according to one or more embodiments, a composite cathode active material may decrease a surface residual lithium amount and improve thermal stability. When the composite cathode active material is used, charging/discharging characteristics and lifetime characteristics of a lithium battery may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material, comprising:
   a secondary particle comprising
   a plurality of primary particles comprising a lithium transition metal oxide having a layered crystal structure; and
   a coating layer disposed on a surface of the secondary particle and between primary particles of the plurality of primary particles,
   wherein the coating layer comprises a compound having a spinel crystal structure, and
   wherein the coating layer comprises a compound represented by Formula 1:

$$Li_xCO_aMe_bO_{4+\delta} \qquad \text{Formula 1}$$

wherein, in Formula 1, Me is a Group 2 element, a Group 12 element, a Group 13 element, or a combination thereof, and
   wherein $1.0 \leq x \leq 1.1$, $0 < a < 2$, $0.4 \leq b \leq 1.6$, $0 < a+b \leq 2$ and $-1.5 \leq \delta \leq 0$.

2. The composite cathode active material of claim 1, wherein the coating layer is present in a grain boundary between adjacent primary particles of the plurality of primary particles, and on the surface of the secondary particle.

3. The composite cathode active material of claim 1, wherein, in Formula 1,
   wherein $1.0 \leq x \leq 1.09$, $0.4 \leq a \leq 1.6$, $0.4 \leq b \leq 1.6$.

4. The composite cathode active material of claim 1, wherein Me in Formula 1 is Al, Ga, Mg, Ca, Ba, Zn, or a combination thereof.

5. The composite cathode active material of claim 1, wherein the compound represented by Formula 1 is $Li_xCo_aAl_bO_{4+\delta}$, $Li_xCo_aZn_bO_{4+\delta}$, $Li_xCo_aMg_bO_{4+\delta}$, $Li_xCo_aGa_bO_{4+\delta}$, $Li_xCo_aCa_bO_{4+\delta}$, $Li_xCo_aBa_bO_{4-\delta}$, wherein $1.0 \leq x \leq 1.1$, $0 < a < 2$, $0.4 \leq b \leq 1.6$, $0 < a+b \leq 2$ and $-1.5 \leq \delta \leq 0$.

6. The composite cathode active material of claim 1, wherein the compound represented by Formula 1 is $Al_{0.5}O_{4+\delta}$ wherein $-0.5 \leq \delta \leq 0$, $LiCo_{1.5}Ga_{0.5}O_{4+\delta}$ wherein $-0.5 \leq \delta \leq 0$, $LiCo_{1.33}Zn_{0.67}O_{4+\delta}$ wherein $-0.835 \leq \delta \leq 0$, $LiCo_{1.33}Ca_{0.67}O_{4+\delta}$ wherein $-0.835 \leq \delta \leq 0$, $LiCo_{1.33}Ba_{0.67}O_{4+\delta}$ wherein $-0.835 \leq \delta \leq 0$, $LiCo_{1.33}Ga_{0.67}O_{4+\delta}$ wherein $-0.835 \leq \delta \leq 0$, $LiCo_{1.2}Mg_{0.8}O_{4+\delta}$ wherein $-0.9 \leq \delta \leq 0$, $LiCo_{1.2}Ga_{0.8}O_{4+\delta}$ wherein $-0.9 \leq \delta \leq 0$, $LiCo_{1.2}Ca_{0.8}O_{4+\delta}$ wherein $-0.9 \leq \delta \leq 0$, $LiCo_{1.2}Ba_{0.8}O_{4+\delta}$ wherein $-0.9 \leq \delta \leq 0$, $LiCo_{1.2}Zn_{0.8}O_{4+\delta}$ wherein $-0.9 \leq \delta \leq 0$, $LiCo_{1.6}Mg_{0.4}O_{4+\delta}$ wherein $-0.7 \leq \delta \leq 0$, $LiCo_{1.6}Ga_{0.4}O_{4+\delta}$ wherein $-0.7 \leq \delta \leq 0$, $LiCo_{1.6}Ca_{0.4}O_{4+\delta}$ wherein $-0.7 \leq \delta \leq 0$, $LiCo_{1.6}Ba_{0.4}O_{4+\delta}$ wherein $-0.7 \leq \delta \leq 0$, $LiCo_{1.6}Zn_{0.4}O_{4+\delta}$ wherein $-0.7 \leq \delta \leq 0$, $LiCo_{0.8}Mg_{1.2}O_{4+\delta}$ wherein $-1.1 \leq \delta \leq 0$, $LiCo_{0.8}Ga_{1.2}O_{4+\delta}$ wherein $-1.1 \leq \delta \leq 0$, $LiCo_{0.8}Ca_{1.2}O_{4+\delta}$ wherein $-1.1 \leq \delta \leq 0$, $LiCo_{0.8}Ba_{1.2}O_{4+\delta}$ wherein $-1.1 \leq \delta \leq 0$, $LiCo_{0.8}Zn_{1.2}O_{4+\delta}$ wherein $-1.1 \leq \delta \leq 0$, $LiCo_{0.4}Mg_{1.6}O_{4+\delta}$ wherein $-1.3 \leq \delta \leq 0$, $LiCo_{0.4}Ga_{1.6}O_{4+\delta}$ wherein $-1.3 \leq \delta \leq 0$, $LiCo_{0.4}Ca_{1.6}O_{4+\delta}$ wherein $-1.3 \leq \delta \leq 0$, $LiCo_{0.4}Ba_{1.6}O_{4+\delta}$ wherein $-1.3 \leq \delta \leq 0$, or $LiCo_{0.4}Zn_{1.6}O_{4+\delta}$ wherein $-1.3 \leq \delta \leq 0$.

7. The composite cathode active material of claim 1, wherein the lithium transition metal oxide having a layered crystal structure has a rock-salt layered structure and belongs to space group_R-3m, and
   wherein the compound represented by Formula 1 belongs to space group Fd-3m.

8. The composite cathode active material of claim 1, further comprising a mixed phase between the lithium transition metal oxide and the coating layer, wherein the mixed phase comprises a combination of the lithium transition metal oxide and the compound represented by Formula 1.

9. The composite cathode active material of claim 1, further comprising, between the primary particles, a compound having an amorphous structure, a compound having a layered crystal structure, or a combination thereof.

10. The composite cathode active material of claim 1, wherein the lithium transition metal oxide having a layered crystal structure comprises at least one compound represented by Formulae 2 to 4:

$$Li_xCo_{1-y}M_yO_{2-\alpha}X_\alpha, \qquad \text{Formula 2}$$

$$Li_xNi_{1-y}Me_yO_{2-\alpha}X_\alpha, \text{ and} \qquad \text{Formula 3}$$

$$Li_xNi_{1-y-z}Mn_yMa_zO_{2-\alpha}X_\alpha, \qquad \text{Formula 4}$$

wherein, in Formulae 2 to 4, $0.9 \leq x \leq 1.1$, $0 \leq y \leq 0.9$, $0 \leq z \leq 0.2$, and $0 \leq \alpha \leq 2$,
M is Ni, Mn, Zr, Al, Mg, Ag, Mo, Ti, V, Cr, Fe, Cu, B, or a combination thereof,
Me is Co, Zr, Al, Mg, Ag, Mo, Ti, V, Cr, Mn, Fe, Cu, B, or a combination thereof,
Ma is Co, Zr, Al, Mg, Ag, Mo, Ti, V, Cr, Fe, Cu, B, or a combination thereof, and
X is F, S, P, or a combination thereof.

11. The composite cathode active material of claim 1, wherein the lithium transition metal oxide having a layered crystal structure comprises at least one compound represented by Formulae 5 to 7:

$$Li[Li_{1-a}Me_a]O_{2+d}, \qquad \text{Formula 5}$$

wherein, in Formula 5, $0.8 \leq a \leq 1$, and $0 \leq d \leq 0.1$, and Me is Ni, Co, Mn, Al, V, Cr, Fe, Zr, Re, B, Ge, Ru, Sn, Ti, Nb, Mo, Pt, or a combination thereof, $$Li[Li_{1-x-y-z}Ma_xMb_yMc_z]O_{2+d}, \qquad \text{Formula 6}$$

wherein, in Formula 6, $0.8 \leq x+y+z \leq 1$, $0 < x < 1$, $0 < y < 1$, $0 < z < 1$, and $0 \leq d \leq 0.1$, and Ma, Mb, and Mc are each independently Mn, Co, Ni, or Al, $$Li[Li_{1-x-y-z}Ni_xCo_yMn_z]O_{2+d}, \qquad \text{Formula 7}$$

wherein, in Formula 7, $0.8 \leq x+y+z \leq 1$, $0 < x < 1$, $0 < y < 1$, $0 < z < 1$, and $0 \leq d \leq 0.1$.

12. The composite cathode active material of claim 1, wherein the lithium transition metal oxide is represented by Formula 8:

$$aLi_2MnO_3-(1-a)LiMO_2 \qquad \text{Formula 8}$$

wherein, in Formula 8, $0 < a < 1$; and M is nickel and cobalt, manganese, vanadium, chrome, iron, zirconium, rhenium, aluminum, boron, germanium, ruthenium, tin, titanium, niobium, molybdenum, platinum, or a combination thereof.

13. The composite cathode active material of claim 1, wherein the lithium transition metal oxide having a layered crystal structure is represented by Formula 9:

$$Li_xNi_{1-y-z}M_yCo_zO_2 \qquad \text{Formula 9}$$

wherein, in Formula 9, $0.90 \le x \le 1.1$, $0 \le y \le 0.2$, $0 \le z \le 0.2$, and $0.7 \le 1-y-z \le 0.99$; and M is manganese, aluminum, titanium, calcium, or a combination thereof.

14. The composite cathode active material of claim 1, wherein an average particle diameter of the secondary particle is about 10 micrometers to about 20 micrometers.

15. The composite cathode active material of claim 1, wherein the lithium transition metal oxide having a layered crystal structure is a compound represented by Formula 9a:

$$Li_xNi_{1-y-z}Mn_yCo_zO_2 \qquad \text{Formula 9a}$$

wherein, in Formula 9a, $0.80 \le x \le 1.1$, $0 = y \le 0.2$, $0 < z \le 0.2$, and $0.8 \le 1-y-z \le 0.99$.

16. The composite cathode active material of claim 1, wherein the lithium transition metal oxide having a layered crystal structure $Li_{1.03}[Ni_{0.9}Co_{0.06}Mn_{0.03}]O_2$, $Li_{1.03}[Ni_{0.88}Co_{0.08}Mn_{0.04}]O_2$, $Li_{1.03}[Ni_{0.8}Co_{0.15}Mn_{0.05}]O_2$, $Li_{1.03}[Ni_{0.85}Co_{0.10}Mn_{0.05}]O_2$, $Li_{1.03}[Ni_{0.91}Co_{0.05}Mn_{0.04}]O_2$, $Li_{1.05}[Ni_{0.91}Co_{0.06}Mn_{0.03}]O_2$, $Li_{1.06}[Ni_{0.91}Co_{0.06}Mn_{0.03}]O_2$, $Li_{1.06}[Ni_{0.88}Co_{0.08}Mn_{0.04}]O_2$, $Li_{1.06}[Ni_{0.8}Co_{0.15}Mn_{0.05}]O_2$, $Li_{1.06}[Ni_{0.85}Co_{0.10}Mn_{0.05}]O_2$, $Li_{1.06}[Ni_{0.91}Co_{0.05}Mn_{0.04}]O_2$, $Li_{1.09}[Ni_{0.91}Co_{0.06}Mn_{0.03}]O_2$, $Li_{1.09}[Ni_{0.88}Co_{0.08}Mn_{0.04}]O_2$, $Li_{1.09}[Ni_{0.8}Co_{0.15}Mn_{0.05}]O_2$, $Li_{1.09}[Ni_{0.85}Co_{0.10}Mn_{0.05}]O_2$, or $Li_{1.09}[Ni_{0.91}Co_{0.05}Mn_{0.04}]O_2$.

17. The composite cathode active material of claim 1, wherein an amount of the compound represented by Formula 1 in the coating layer is about 0.01 parts to about 20 parts by weight, based on 100 parts by weight of the lithium transition metal oxide having a layered crystal structure.

18. The composite cathode active material of claim 1, wherein a residual lithium content of the composite cathode active material is 90% or less of a residual lithium content of the secondary particle comprising the lithium transition metal oxide having a layered crystal structure.

19. The composite cathode active material of claim 1, wherein 50% or more of a surface of the lithium transition metal oxide having a layered crystal structure is covered by the coating layer.

20. The composite cathode active material of claim 1, wherein a thickness of the coating layer is about 1 micrometer or less.

21. A cathode comprising the composite cathode active material of claim 1.

22. A lithium battery comprising:
the cathode of claim 21;
an anode; and
an electrolyte between the cathode and the anode.

23. A method of preparing a composite cathode active material of claim 1, the method comprising:
obtaining a lithium transition metal oxide comprising a layered crystal structure; mixing the lithium transition metal oxide having a layered crystal structure with a precursor of a compound represented by Formula 1 having a spinel structure, $$Li_xCo_aMe_bO_{4+\delta} \qquad \text{Formula 1}$$

wherein, in Formula 1, Me is a Group 2 element, a Group 12 element, a Group 13 element, or a combination thereof, and
wherein $1.0 \le x \le 1.1$, $0 < a < 2$, $0.4 \le b \le 1.6$, $0 < a+b \le 2$ and $-1.5 \le \delta \le 0$ to prepare a composite cathode active material composition;
drying the composite cathode active material composition; and
heat-treating the dried composite cathode active material composition at a temperature in a range of about 400° C. to about 1000° C. in an oxidizing gas atmosphere to prepare the composite cathode active material.

24. The method of claim 23, wherein the mixing comprises wet-mixing in the presence of a solvent.

25. The method of claim 23, wherein the heat-treating is performed at a temperature of about 700° C. to about 750° C. and comprises heating at a rate of temperature increase of about 1° C. per minute to about 10° C. per minute.

* * * * *